United States Patent
Itoh et al.

(10) Patent No.: US 9,166,800 B2
(45) Date of Patent: Oct. 20, 2015

(54) AUTHENTICATION METHOD, AUTHENTICATION SYSTEM, AND AUTHENTICATION CHIP USING COMMON KEY CRYPTOGRAPHY

(71) Applicant: FUJITSU LIMITED, Kawasaki-shi, Kanagawa (JP)

(72) Inventors: Kouichi Itoh, Kawasaki (JP); Masahiko Takenaka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/020,129

(22) Filed: Sep. 6, 2013

(65) Prior Publication Data

US 2014/0181524 A1   Jun. 26, 2014

Related U.S. Application Data

(63) Continuation of application No. PCT/JP2011/055557, filed on Mar. 9, 2011.

(51) Int. Cl.
| | |
|---|---|
| G06F 21/00 | (2013.01) |
| H04L 9/32 | (2006.01) |
| G06F 21/30 | (2013.01) |
| G06F 21/44 | (2013.01) |

(52) U.S. Cl.
CPC .............. *H04L 9/3273* (2013.01); *G06F 21/30* (2013.01); *G06F 21/445* (2013.01)

(58) Field of Classification Search
CPC ........ G06F 21/30; G06F 21/44; G06F 21/445
USPC .......................... 713/168, 169, 170, 172, 174
See application file for complete search history.

(56) References Cited

U.S. PATENT DOCUMENTS

| 2003/0159036 A1* | 8/2003 | Walmsley et al. ............ 713/168 |
| 2003/0233546 A1 | 12/2003 | Blom |
| 2006/0101136 A1 | 5/2006 | Akashika et al. |

(Continued)

FOREIGN PATENT DOCUMENTS

| JP | 6-289781 | 10/1994 |
| JP | 2006-99509 | 4/2006 |

(Continued)

OTHER PUBLICATIONS

International Search report of International Application No. PCT/JP2011/055557 mailed on Apr. 5, 2011.

(Continued)

*Primary Examiner* — Edward Zee
(74) *Attorney, Agent, or Firm* — Staas & Halsey LLP

(57) ABSTRACT

A method is disclosed for authenticating, by a processor that controls a parent device, a child device includes: authenticating the child device by making a comparison between a value obtained by operating, for a first response value, a third transform function, which is decided based on a number of a difference between the value set in an authentication chip of the parent device and the value set in an authentication chip of the child device, and the second response value, wherein a first and a second response values are obtained by operating a first and a second transform functions for output values generated by operating an encryption function for performing encryption for secret keys in authentication chips of the parent device and the child device, respectively.

13 Claims, 31 Drawing Sheets

(56) References Cited

U.S. PATENT DOCUMENTS

2010/0235900 A1* 9/2010 Robinton et al. .............. 726/9
2011/0179274 A1* 7/2011 Veugen et al. ................ 713/169
2012/0221863 A1 8/2012 Osaka et al.

FOREIGN PATENT DOCUMENTS

JP 2012-174195 9/2012
WO 03/107712 A1 12/2003

OTHER PUBLICATIONS

Office Action mailed May 27, 2014 in corresponding Japanese Patent Application No. 2013-503296.
PCT International Preliminary Report on Patentability issued Sep. 19, 2013 in corresponding International Application No. PCT/JP2011/055557.

* cited by examiner

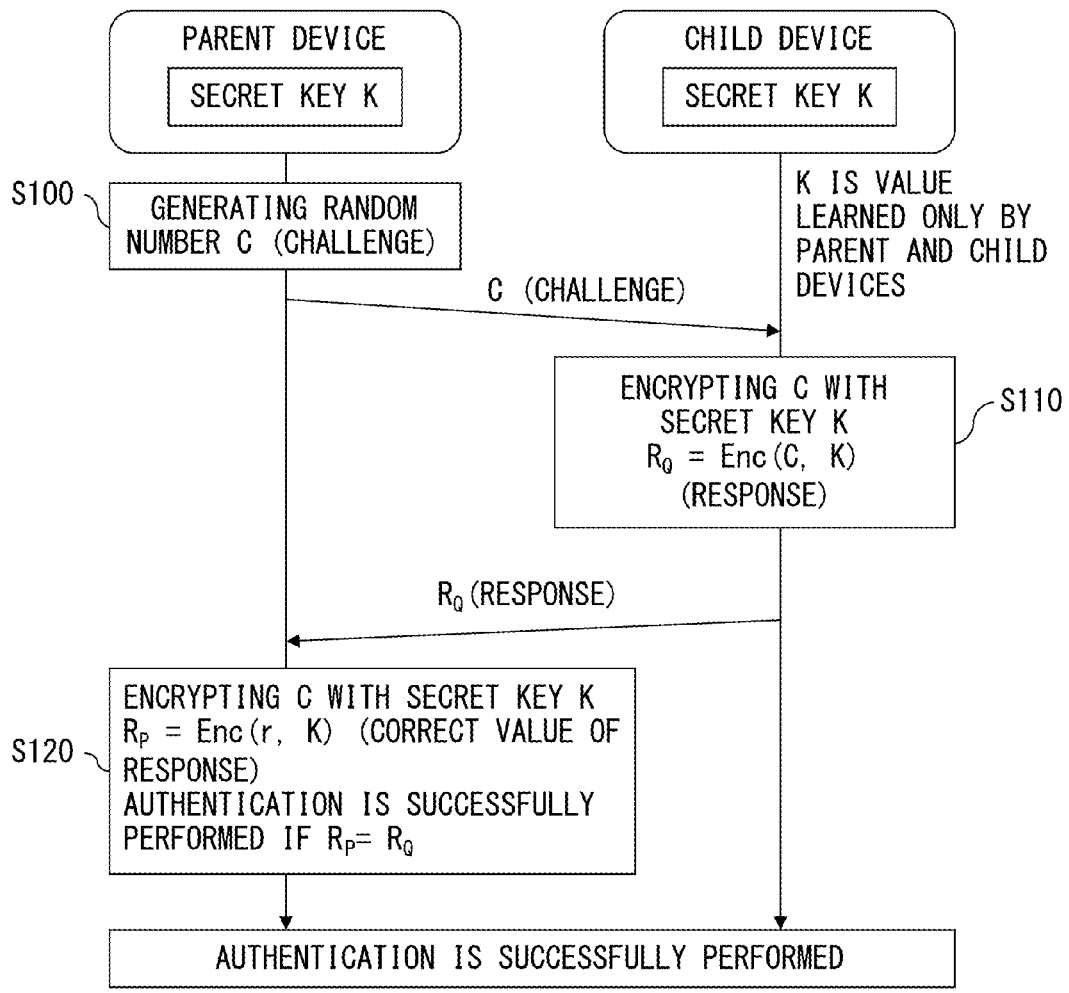
F I G. 2

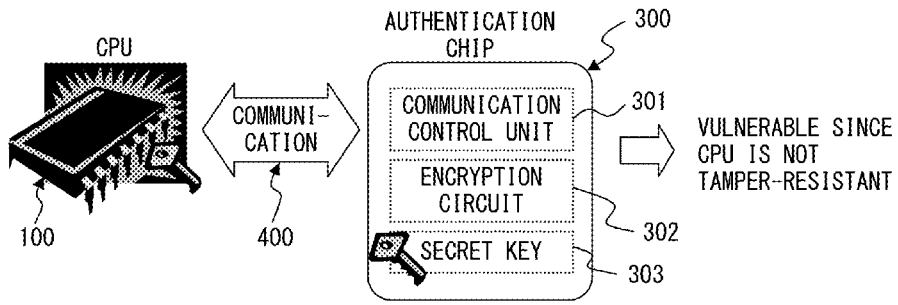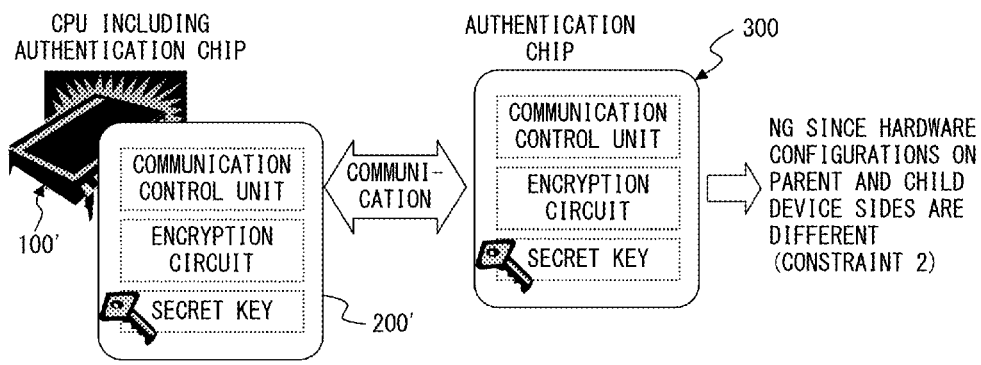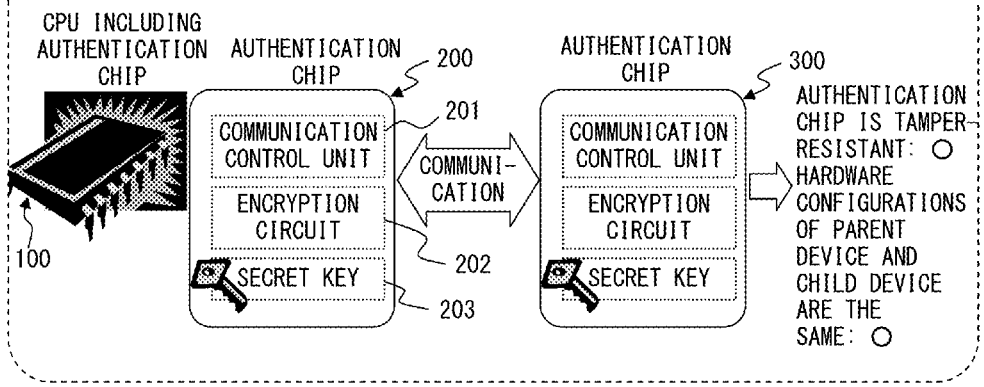
F I G. 3

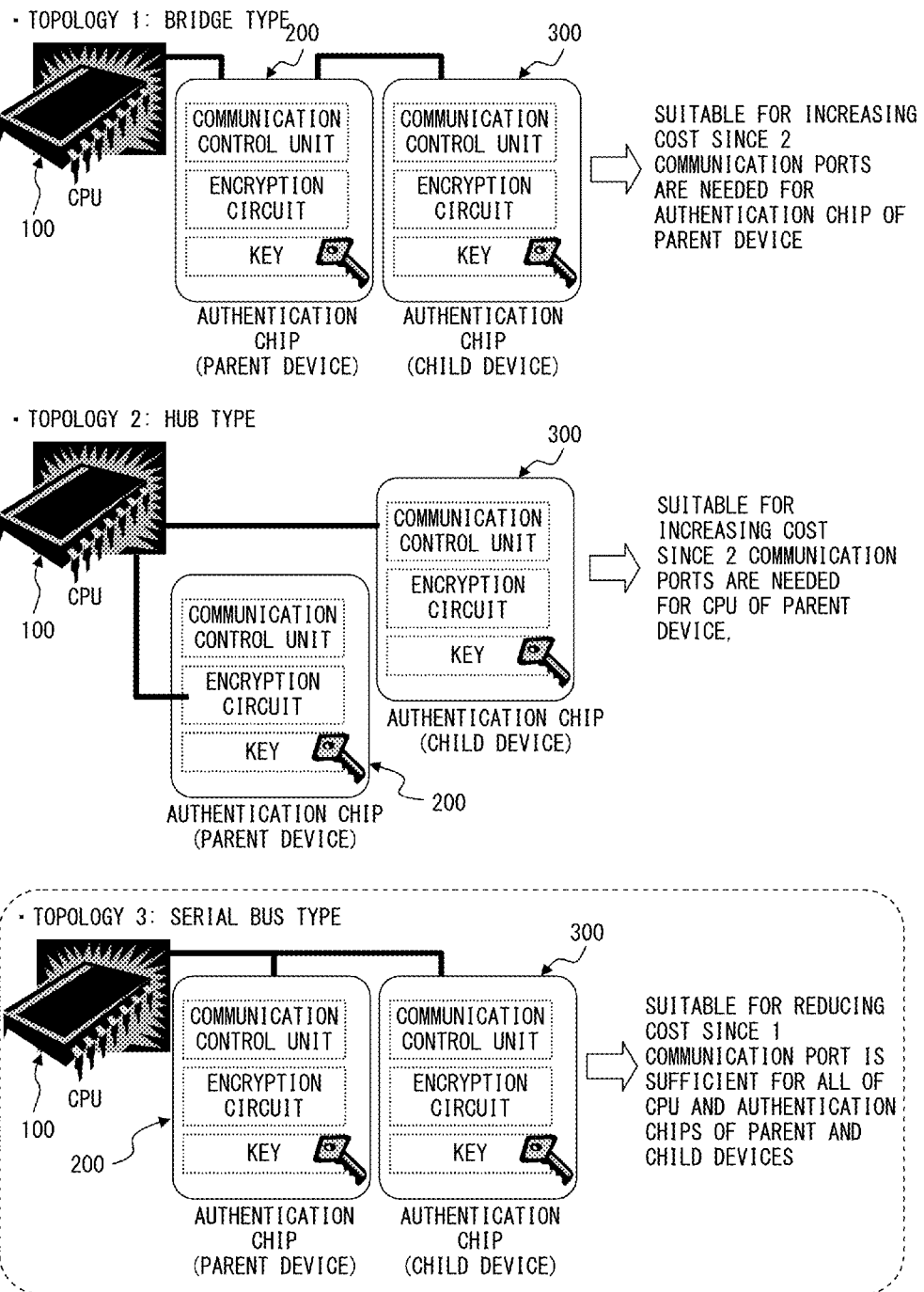
F I G. 4

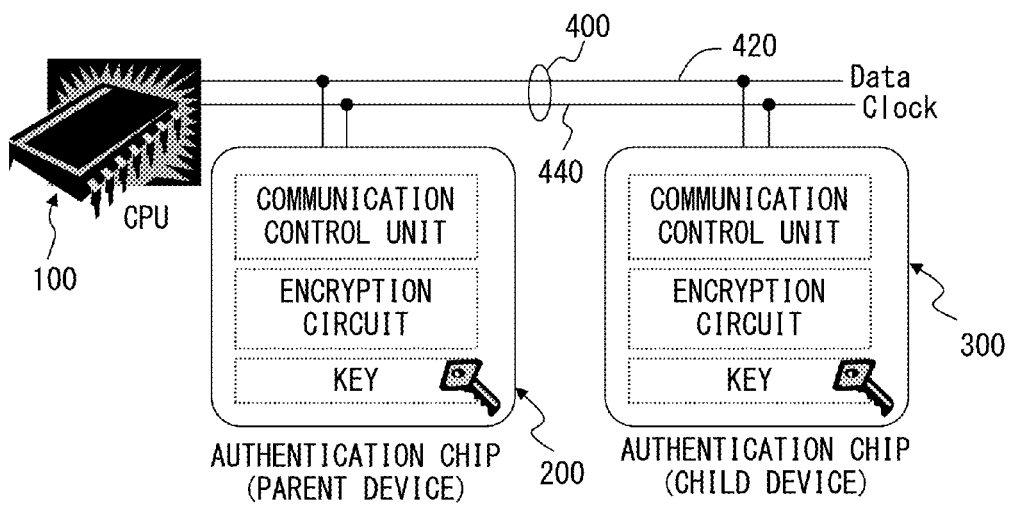
F I G. 5

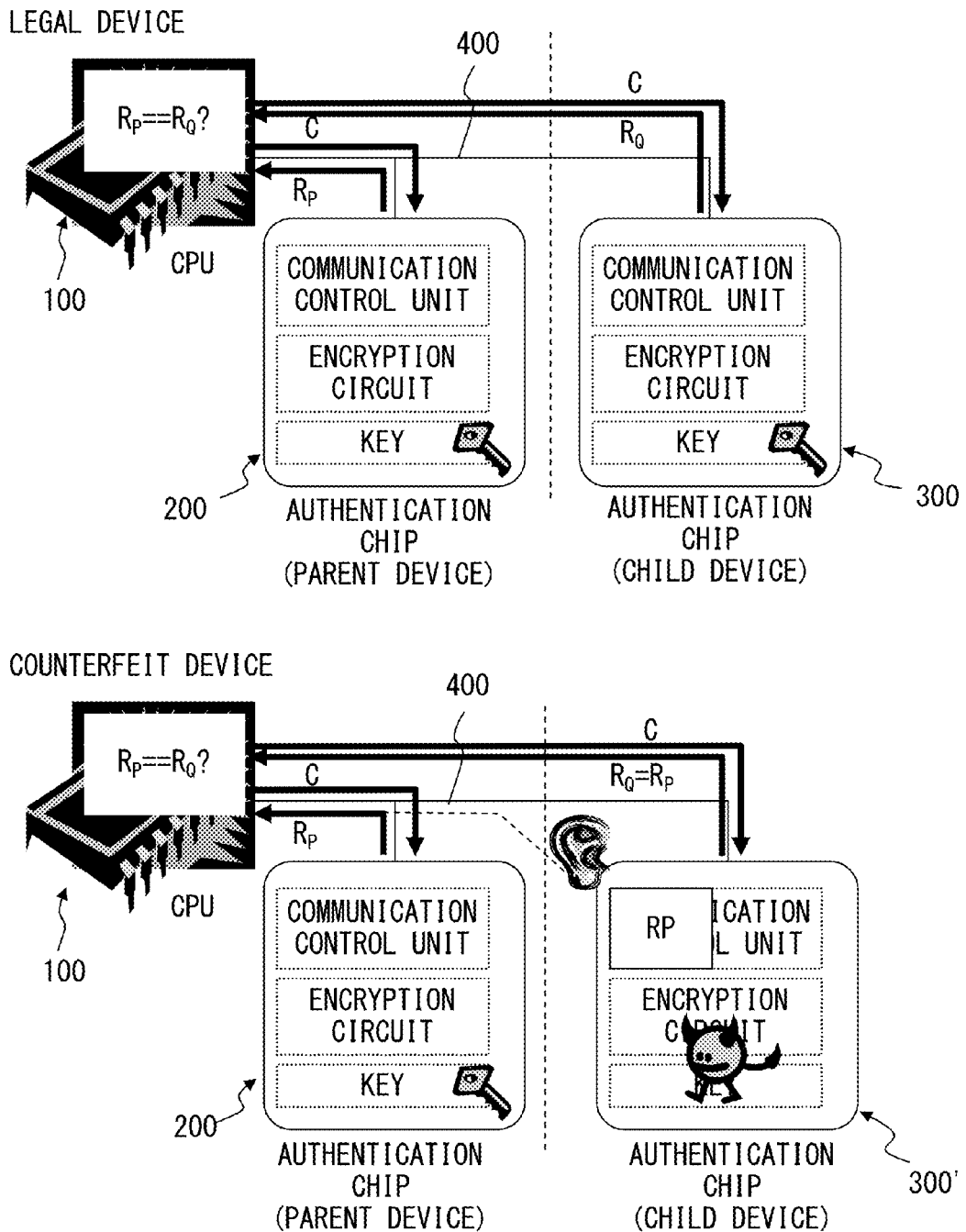
F I G. 7

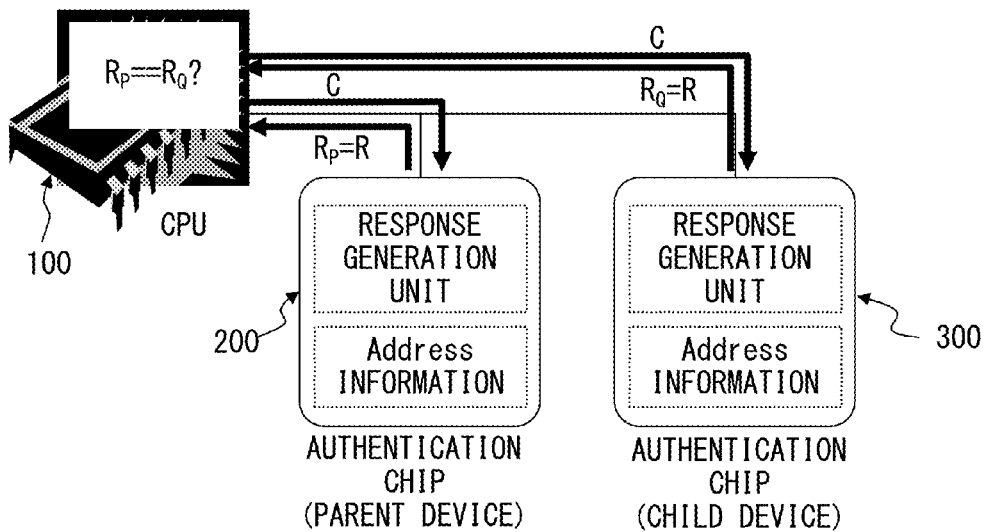
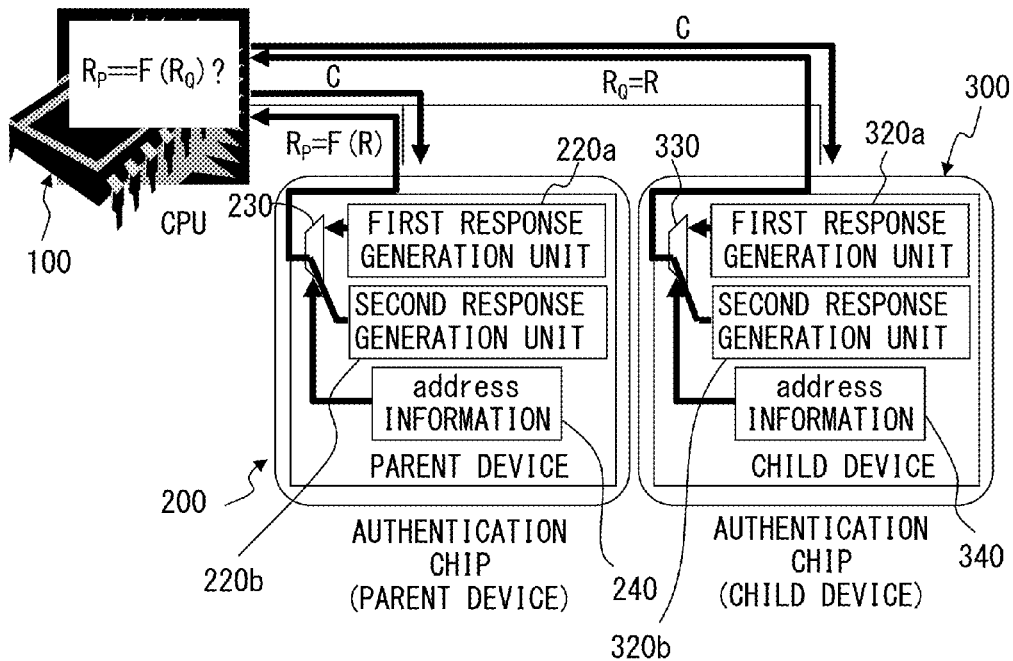
F I G. 9

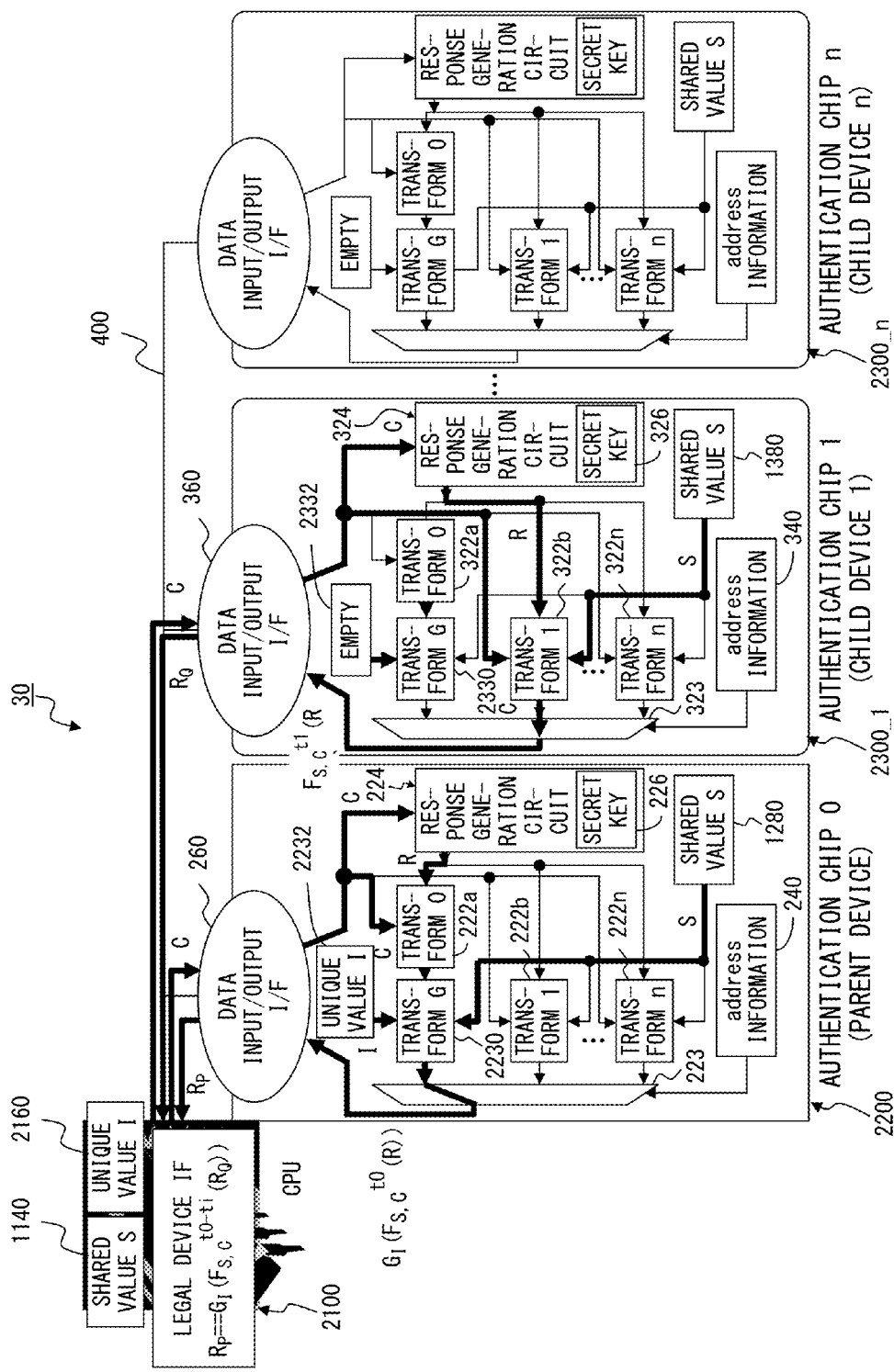
F I G. 16

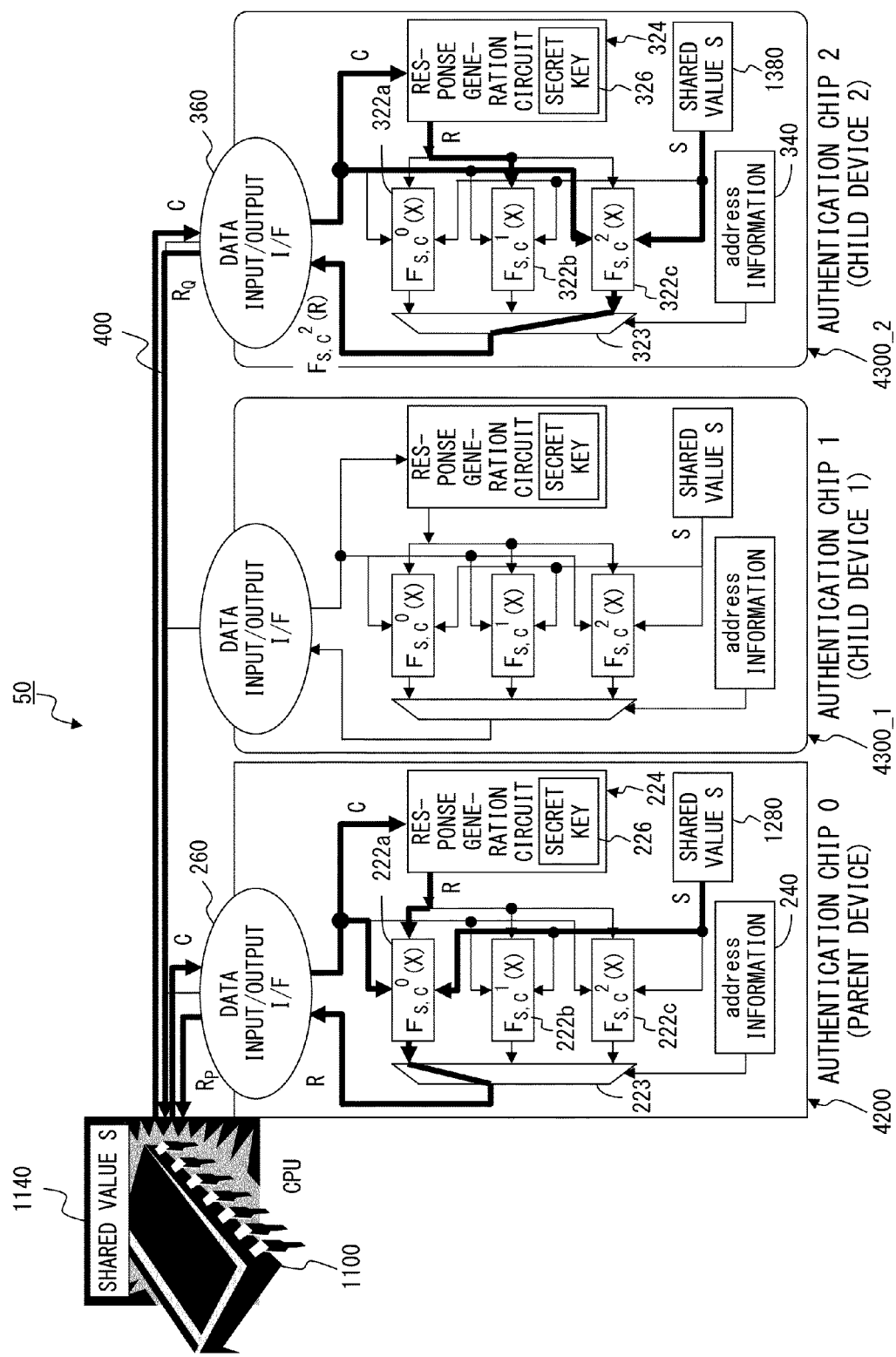
F I G. 2 4

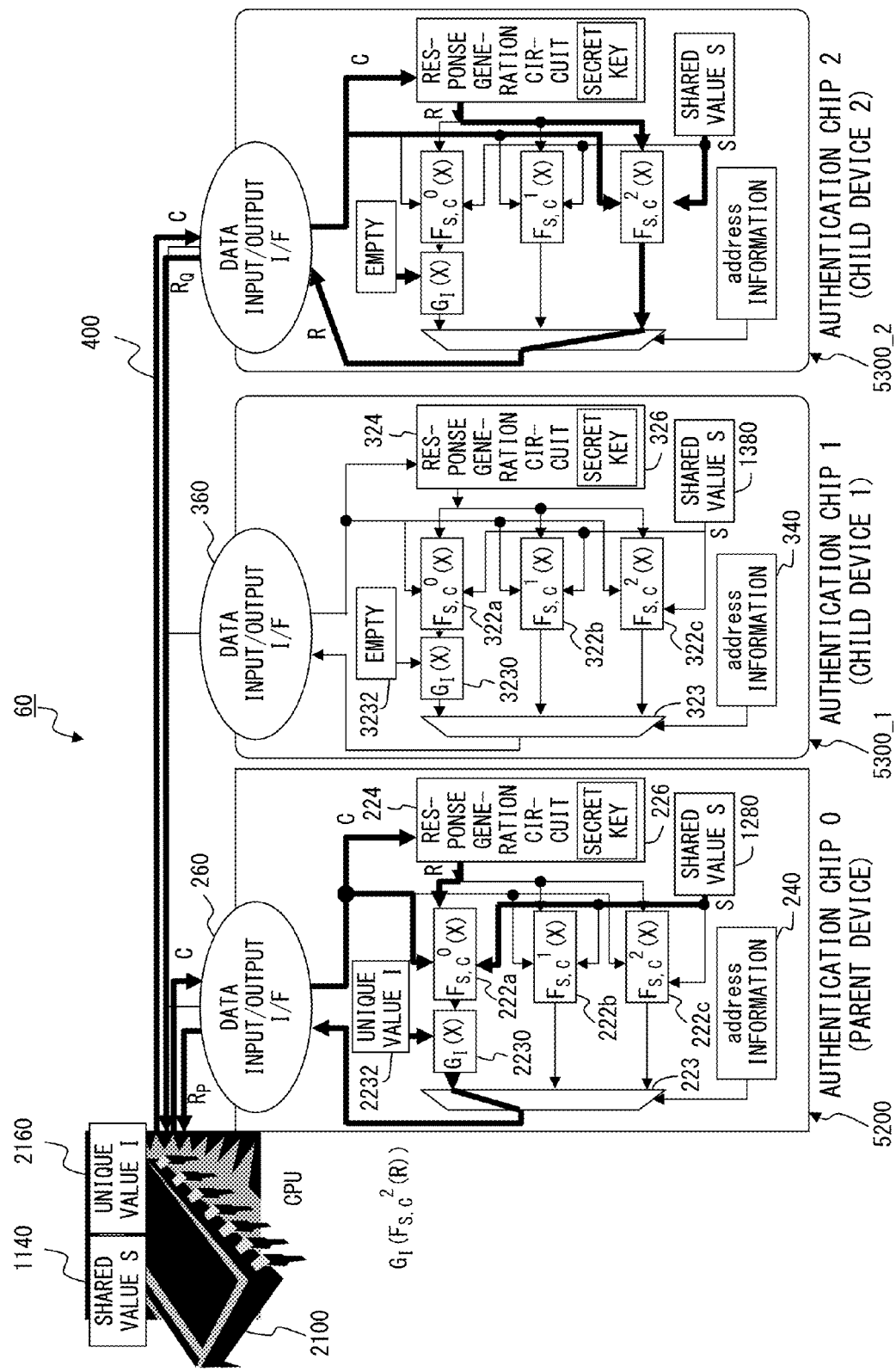
F I G. 27

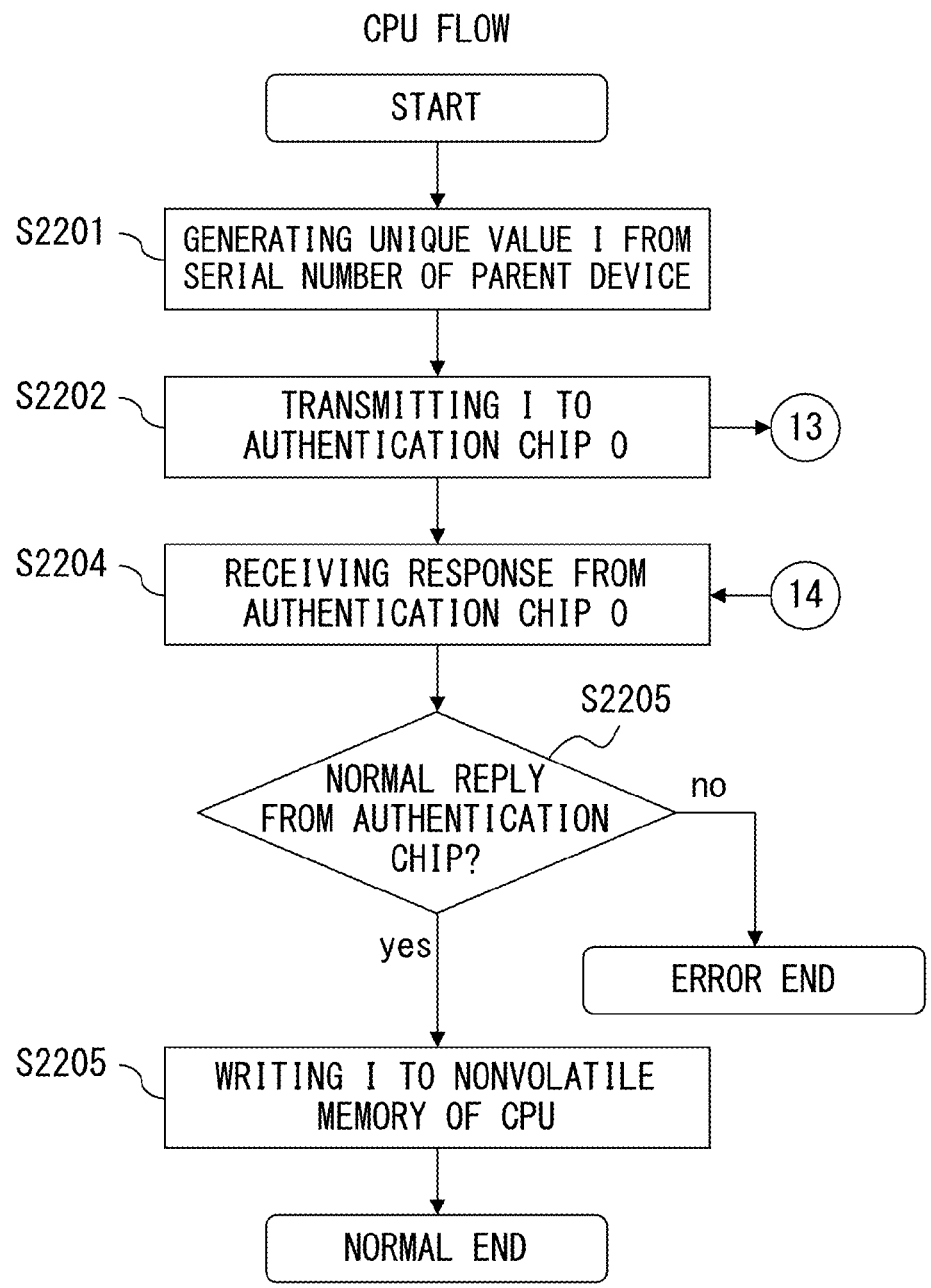
F I G. 2 8

AUTHENTICATION METHOD, AUTHENTICATION SYSTEM, AND AUTHENTICATION CHIP USING COMMON KEY CRYPTOGRAPHY

CROSS-REFERENCE TO RELATED APPLICATION

This application is a continuation application of International Application No. PCT/JP2011/055557 filed on Mar. 9, 2011 and designated the U.S., the entire contents of which are incorporated herein by reference.

FIELD

The embodiments discussed here are related to electronic device authentication device and method using common key cryptography, and more particularly, to an authentication system technique for preventing an embedded appliance having a common key cryptography function from being counterfeited.

BACKGROUND

By using embedded appliances having an authentication function in order to make a distinction between a regular product and a counterfeit in fields of printer cartridges and medical equipment, customers can be protected from damages caused by inferior counterfeits. Namely, precluding counterfeits of embedded appliances having an authentication function directly links to protection of profits of customers who use products. Therefore, precluding counterfeits of embedded appliances having an authentication function is a highly significant challenge in industrial fields.

In authentication, cryptographies are used as a core function. Cryptographies are broadly classified into a public key cryptography and a common key cryptography. The public key cryptography is a scheme that uses different keys respectively for encryption and decryption, and maintains security by setting a key (secret key) for decrypting an encrypted text as secret information only for a receiver instead of making a key (public key) for performing encryption public. In contrast, the common key cryptography is a scheme that uses the same key (secret key) for encryption and decryption, and maintains security by setting the secret key as information unknown to a third party other than a transmitter and a receiver. In either case, it is the major premise in terms of security that the secret key is not leaked to an outside. As far as this premise is followed, also authentication using any of the public key cryptography and the common key cryptography becomes secure. However, a circuitry scale of the common key cryptography is smaller than that of the public key cryptography, and suited for cost reduction. Therefore, authentication using the common key cryptography is in widespread use, especially, in embedded appliances.

Properties demanded for embedded appliances having a security function include tamper resistance. Tamper resistance means prevention of peeping, and indicates a property that makes it difficult to illegally leak important information such as a secret key and the like stored within an embedded appliance from an outside. For implementation of tamper resistance, it is needed not only to naturally prevent information from being leaked out of a legal input/output terminal included in an embedded appliance but to prevent information from being leaked by an illegal access that directly peeps an internal circuit with a micro-probe. A normal hardware configuration of an IC chip is not resistant to the attack that directly peeps an internal circuit with a micro-probe. Accordingly, to implement tamper resistance, an IC chip having a hardware configuration dedicated to preventing physical and logical illegal accesses from an outside needs to be manufactured.

As a normal method for implementing secure authentication, a method for writing a secret key used for authentication to an inside of a tamper-resistant authentication appliance when being manufactured, and for not taking out the key to an outside after being manufactured is used. This can prevent an illegal third party from acquiring the secret key and counterfeiting the authentication appliance. An authentication protocol is executed between authentication appliances in a state where a secret key is written to the tamper-resistant authentication appliances and the key is not externally taken out, whereby secure authentication is implemented and customers can be protected from damages caused by inferior counterfeits.

For the authentication using common key cryptography, it is difficult to implement secure authentication under three constraints such that a secret key is not leaked to an outside, a manufacturing cost is reduced, and a communication topology is simplified as much as possible. Therefore, secure and compact authentication protocol and system, which prevent counterfeits even under these constraints, are demanded.

SUMMARY

A method for authenticating, by a processor that controls a first device, a second device includes: generating a random number; transmitting the random number to an authentication chip of the first device and an authentication chip of the child device; receiving, from the authentication chip of the first device, a first response value obtained by operating a first transform function, which is decided based on a value set in the authentication chip of the first device, for an output value generated by operating an encryption function for performing encryption for an integer stored in the authentication chip of the first device as a secret key, and the random number; receiving, from the authentication chip of the second device, a second response value obtained by operating a second transform function, which is decided based on a value set in the authentication chip of the second device, for the output value generated by operating the encryption function for performing encryption for the integer stored in the authentication chip of the second device as a secret key, and the random number; and authenticating the second device by making a comparison between a value obtained by operating, for the first response value, a third transform function, which is decided based on a number of a difference between the value set in the authentication chip of the first device and the value set in the authentication chip of the second device, and the second response value, or by making a comparison between a value obtained by operating the third transform function for the second response value and the first response value.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 2 illustrates a challenge-response authentication protocol using common key cryptography;

FIG. 3 illustrates types of mounting forms on parent device and child device sides in an authentication system;

FIG. 4 illustrates types of forms of communication topologies based on Form 3;

FIG. 5 illustrates an example (I2C bus) of a combination of Form 3 and Topology 3;

FIG. 7 illustrates an attack method using tapping;

FIG. 9 illustrates a system according to a first embodiment of the present invention;

FIG. 16 illustrates a system according to a fourth embodiment of the present invention;

FIG. 24 illustrates a system according to a sixth embodiment of the present invention;

FIG. 27 illustrates a system according to a seventh embodiment of the present invention;

FIG. 28 is a flowchart illustrating a process executed by a CPU when an authentication chip 0 is mounted in the CPU in the system according to the seventh embodiment of the present invention;

DESCRIPTION OF EMBODIMENTS

Figure 1:
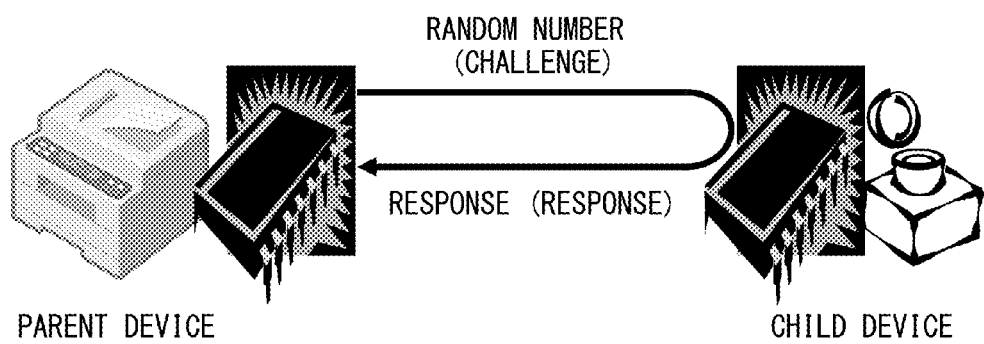
FIG. 1 is a schematic illustrating a challenge-response authentication protocol.

An authentication system using a common key according to the present invention is described below with reference to the drawings. In the authentication system, a value returned as a response is different even if the same value is transmitted to a parent device and a child device as a challenge. Therefore, the authentication system that has a high level of security, can be cost-effectively manufactured, and has a simple function of communicating with an external device can be obtained. A comparison example is initially described. Subsequently, first to seventh embodiments according to the present invention will be described by covering advantages over the comparison example. In the following description, like components or components having like functions are denoted with like reference numerals in the drawings, and detailed explanations are omitted except when they firstly appear.

Comparison Example

A system where a first device authenticates a second device by using a common key cryptography is described. In explanations of embodiments, a first device, which is an authenticating side, and a second device, which is an authenticated side, are referred to as a parent device and a child device, respectively when needed. The system where the parent device includes a CPU 100 and an authentication chip 200, and the child device includes an authentication chip 300 is described as a system considered under three constraints such that a secret key is not leaked to an outside, a manufacturing cost is reduced, and a communication topology is simplified as much as possible.

In the authentication chips, a communication protocol called a challenge-response authentication protocol is used to verify legality of an appliance. FIG. 1 is a schematic illustrating the challenge-response authentication protocol. In the challenge-response authentication, a random number, which is a password using digital information and called a "challenge", is transmitted from an authenticating side (parent device) to an authenticated side (child device). In contrast, the child device side generates a response called "response" to the "challenge", and returns the response to the parent device. The parent device determines a value of the "response" to the "challenge", and determines the child device as a legal device if the value is correct.

By using a random number as the "challenge", a "response" to the "challenge" varies every time. As a result, preventive measures against a retransmission attack are taken. The retransmission attack is an attack that spoofs a legal appliance by repeating a response that was externally observed in the past. Namely, when a random number is not used, a pair of a challenge and a response results in a completely unique value. Therefore, an attacker can learn a suitable response to a challenge by observing this pair, whereby a chip is easily counterfeited by manufacturing the chip that returns this response. For example, if a malicious third party can learn that a system uses only a password, such as "river" in response to "mountain", the attacker can perform spoofing by making a response "river" in all cases.

A method for generating a "response" to a "challenge" is a normal method using an encryption function. Advantages and disadvantages vary depending on which encryption function is used. For an authentication chip, a method using a common key cryptography that offers an advantage capable of giving a priority to compactness of a circuitry scale is widely used.

FIG. 2 illustrates the challenge-response authentication protocol using a common key cryptography.

With the protocol illustrated in FIG. 2, the authentication chips of the parent device and the child device share a secret key K in advance. This can be implemented by writing the value of the secret key K when the chips are manufactured. The important premise in terms of security is that this value is not leaked to an outside. In S100, the parent device on the authenticating side generates a random number C, and transmits the generated random number to the child device on the authenticated side. This random number C is referred to as a "challenge". In S110, the child device obtains an output value R=Enc(C,K) by executing an encryption process for the received challenge C with the secret key K. Then, the child device returns the output value R to the parent device as a "response $R_Q$". b=Enc(a,K) indicates that a result obtained by encrypting a plain text a with the key K by using the common key cryptography is an encrypted text b. In S120, the parent device that has received the response $R_Q$ from the child device obtains an output value R=Enc(C,K) by executing an encryption process with the secret key K similarly to the child device, and obtains a correct answer value $R_P$=R. If the response $R_Q$ from the child device matches the correct answer value $R_P$=R, the parent device authorizes the child device as a legal device. The legal response $R_P$ to the challenge C can be generated only in a case where the secret key K is possessed. Therefore, the parent device can verify the legality of the child device.

The challenge-response protocol, for example, illustrated in FIG. 2 is a theoretically secure authentication protocol. However, since constraints are placed on authentication in the real world, a possibility that the protocol does not become secure still remains. Especially, it is difficult to implement secure authentication under the following three constraints, and a secure authentication protocol (system) that can preclude counterfeits even under these constraints is demanded to be implemented.

Constraint 1: Non-leakage of a secret key to an outside
Constraint 2: Constraint on a manufacturing cost
Constraint 3: Constraint on a communication topology Non-leakage of a secret key to an outside under Constraint 1 can be implemented by using a tamper-resistant authentication chip. For the constraint on a manufacturing cost in Constraint 2, the manufacturing cost of an authentication chip can be reduced by making hardware configuration of parent and child device sides of the authentication chip identical. The constraint on a communication topology in Constraint 3 is derived from the need for simplifying a communication form (topology) as much as possible. In the system according to the present invention, an authentication protocol (system) that disables an authentication appliance to be counterfeited even under Constraints 1, 2, and 3 can be implemented. Especially, Constraint 1 can be resolved by using a generally known tamper-resistant technique. However, secure authentication cannot be implemented under Constraints 2 and 3 only with conventional techniques.

A mounting form of authentication chips is decided under Constraint 2, and a communication topology is decided under Constraint 3. Thus decided combination of the authentication chips and the communication topology can possibly threaten the security of authentication. A mounting form of authentication chips, which is decided under Constraint 2, is initially described with reference to FIG. 3.

FIG. 3 illustrates types of mounting forms of authentication chips on the parent device side and the child device side in the authentication system. Fundamental requirements of the authentication system are as follows.

Composed of a parent device and a child device.

An authentication chip or a CPU is mounted respectively in the parent device and the child device. However, a CPU as a controller for managing functions of the entire device is mounted in the parent device side in all cases.

The authentication chips or the CPU mounted in the parent device and the child device communicate with each other to execute the authentication protocol, so that the parent device side determines whether or not the child device is a legal device.

If the parent device side determines the child device as a legal device, the CPU on the parent device side permits the parent device to use resources of the child device for the parent device. Examples include permission for a printer as a parent device to use ink of a child device in a case of a printer cartridge, and permission for an appliance as a parent device to use an optional appliance of a child device in a case of medical equipment. As described above, in the challenge-response protocol, it is the premise that a value of a key is not leaked to an outside in order to prevent an illegal counterfeit. Encryption and decryption processes using a fixed key can be possibly targeted by a side-channel attack.

As mounting forms of this system, the following forms 1 to 3 are considered as illustrated in FIG. 3.

Form 1: Implementing the parent device side and the child device side respectively with the CPU 100 and the authentication chip 300.

Form 2: Implementing the parent device side and the child device side respectively with a CPU 100' of an authentication chip including type, which includes an authentication chip, and the authentication chip 300.

Form 3: Implementing the parent device side and the child device side respectively with a combination of the CPU 100 and the authentication chip 200, and the authentication chip 300.

In Form 1, the parent device includes the CPU 100, whereas the child device includes the authentication chip 300. The authentication chip 300 included in the child device includes a communication control unit 301, an encryption circuit 302, and a memory 303 for storing a secret key. The communication control unit 301 processes a communication with an outside of a processor, and may be implemented as a processor. The encryption circuit 302 generates an output value as a response by operating an encryption function for an input (such as a challenge). The encryption circuit 302 may be implemented as a dedicated circuit or a general-purpose computer. The secret key is read from the encryption circuit 302, and storable in the memory 303. Preferably, the memory 303 is nonvolatile. If a common key cryptography is used as an authentication protocol, a secret key needs to be written to the CPU 100 of the parent device. Since the value of this secret key is common to products inclusive of all parent devices and child devices, there is a high possibility that the secret key is leaked out of the CPU 100 that is not tamper-resistant, so that counterfeiting is facilitated. Namely, Constraint 1 is not satisfied.

In Form 2, the parent device includes the CPU 100' of an authentication chip including type, which includes the authentication chip 200'. The authentication chip 200' has the same configuration as the authentication chip 200 to be described later although the authentication chip 200' is different in that it is included in the CPU. Namely, the authentication chip 200' includes a communication control unit 201, an encryption circuit 202, and a memory 203 for storing a secret key, which are identical to the communication control unit 301, the encryption circuit 302, and the memory 303 for storing a secret key in the authentication chip 300. The child device is similar to that defined in Form 1. In this embodiment, the authentication chip 200' having a tamper-resistant function is included in the CPU 100', whereby a risk such that a secret key is leaked out of the CPU is eliminated, and Constraint 1 is satisfied. However, since the parent device side and the child device side are implemented respectively with the CPU 100' of the authentication chip including type and the normal authentication chip 300, Constraint 2 is not satisfied.

In Form 3, the parent device includes the CPU 100 and the authentication chip 200, whereas the child device includes the authentication chip 300. Since the tamper-resistant authentication chips 200 and 300 are used in both the parent device and the child device in this embodiment, Constraint 1 is satisfied. Moreover, since the same authentication chip is used in both the parent device and the child device, Constraint 2 is satisfied.

FIG. 4 illustrates types of forms of communication topologies based on Form 3.

A bridge type of Topology 1 is a form where a communication line is linked from the authentication chip on the parent device side respectively to the CPU of the parent device and the authentication chip of the child device. Since two communication ports are needed for the authentication chip of the parent device (two communication ports are also needed for the authentication chip of the child device having the same hardware configuration), this is not suitable for reducing cost. Namely, Constraint 3 is not satisfied.

A hub type of Topology 2 is a form where a communication line is linked from the CPU 100 included in the parent device respectively to the authentication chip 200 of the parent device and the authentication chip 300 of the child device. Since two communication ports are needed for the CPU, this is not suitable for reducing cost. Namely, Constraint 3 is not satisfied.

A serial bus type of Topology 3 is a form where all the CPU 100 included in the parent device, the authentication chip 200 of the parent device, and the authentication chip 300 of the child device are connected by a shared communication line in the form of a bus. Since only one communication port is sufficient for all the CPU 100 of the parent device, the authentication chip 200 of the parent device, and the authentication chip 300 of the child device, this is suitable for reducing cost. Namely, Constraint 3 is satisfied.

That is, the serial bus type connection based on Form 3 is a form preferable to satisfy the above described Constraints 1, 2, and 3.

However, even if these constraints are satisfied, the following problem in terms of security can possibly occur.

FIG. 5 illustrates an example of a combination of Form 3 and Topology 3. As a serial bus I/F, diverse types are known. In FIG. 5, the CPU 101, the authentication chip 200 of the parent device, and the authentication chip 300 of the child device are connected by an I2C bus 400. The I2C bus 400 connects all the appliances with two lines such as a data line 420 and a clock line 440. It is known that the I2C bus 400 has a problem such that data is easily tapped or falsified since all the appliances are connected by one line although an advantage that the I2C bus 400 can connect a plurality of appliances with only one of the two communication lines is offered.

The problem in terms of security is described with reference to FIGS. 6 to 8.

Figure 6:
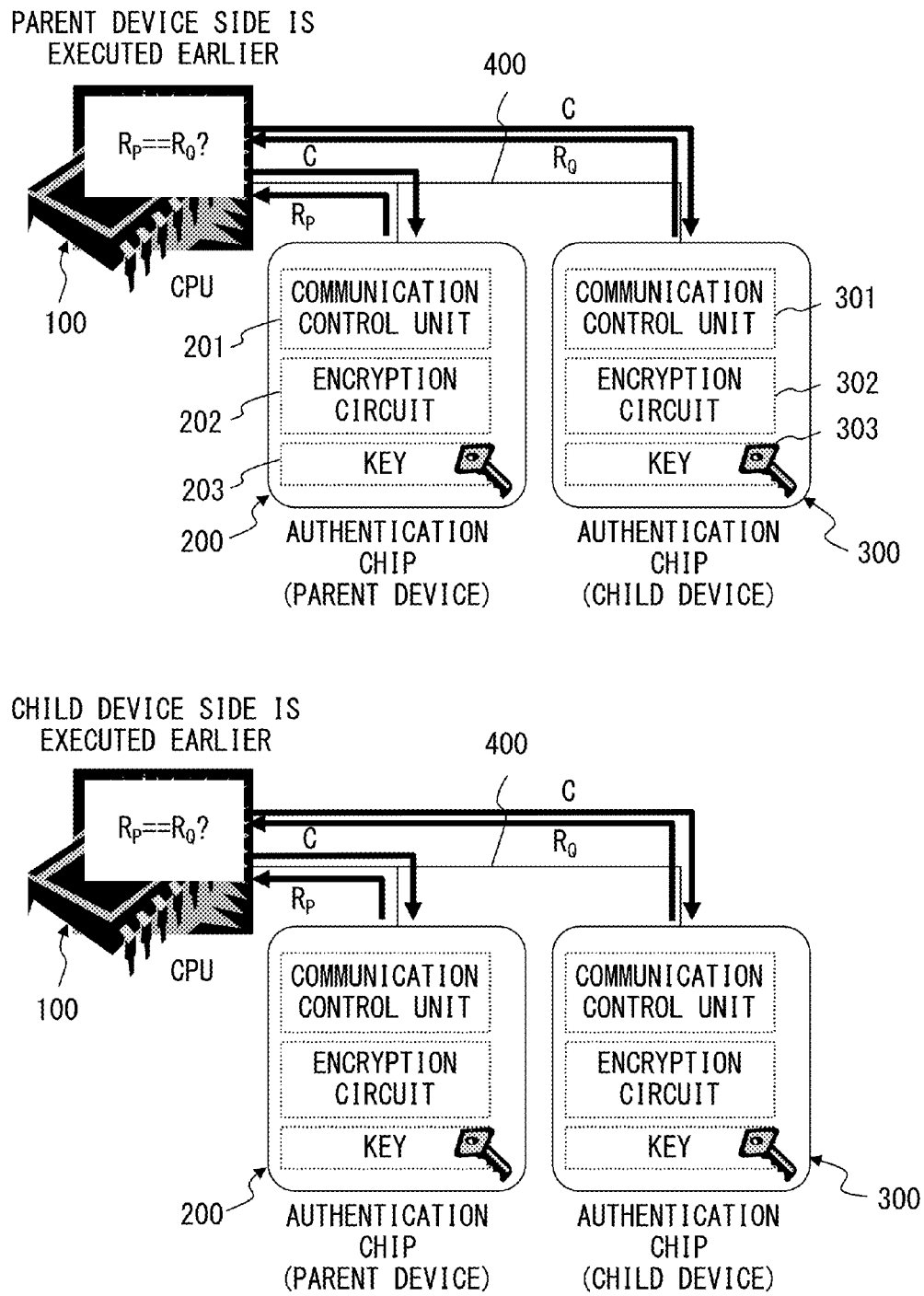
FIG. 6 illustrates a challenge-response protocol.

Executing the challenge-response protocol illustrated in FIG. 2 unchanged in the communication topology illustrated in FIG. 5 with the property such that data on the I2C bus is easily tapped or falsified results in a state illustrated in FIG. 6.

In FIG. 6, the CPU 100 transmits a challenge C respectively to the authentication chip 200 of the parent device and the authentication chip 300 of the child device via the bus 400, and makes a comparison between a response $R_Q$ from the authentication chip 300 of the child device and a response $R_P$ from the authentication chip 200 of the parent device. If $R_Q$ and $R_P$ match, the CPU 100 determines the child device including the authentication chip 300 as a legal device. There are two types of methods depending on an order where the CPU 100 starts to transmit the challenge C either to the child device including the authentication chip 300 or to the parent device including the authentication chip 200.

If the CPU 100 transmits the challenge C to the parent device earlier, the CPU 100 outputs the challenge C to the authentication chip 200 of the parent device via the bus 400. The authentication chip 200 of the parent device includes the communication control unit 201, the encryption circuit 202, and the key 203. The challenge C output from the CPU 100 is received by the communication control unit 201. Thereafter, the challenge C is input to the encryption circuit 202, which then obtains the response $R_P$ by using the key 203. The response $R_P$ is transmitted to the CPU 100 via the bus 400. Next, the CPU 100 outputs the challenge C to the authentication chip 300 of the child device via the bus 400. The challenge C is received by the communication control unit 301 of the authentication chip 300 of the child device, and thereafter input to the encryption circuit 302 of the authentication chip 300 of the child device. In the encryption circuit 302, the response $R_Q$ is obtained by using the challenge, the key 303, and an encryption function. The response $R_Q$ is transmitted to the CPU 100 via the bus 400. The CPU 100 that has received the response $R_P$ from the parent device and the response $R_Q$ from the child device makes a comparison between the responses, and determines the child device as a legal device if they match.

When the CPU 100 transmits the challenge C to the child device earlier, the CPU initially outputs the challenge C to the authentication chip 300 of the child device, outputs the challenge C to the authentication chip 200 of the parent device after it obtains the response $R_Q$ from the authentication chip 300 of the child device, and obtains the response $R_P$ from the authentication chip 200 of the parent device. Thereafter, the CPU makes a comparison between the responses, and determines the child device as a legal device if they match.

As far as the child device is a legal device, there is no problem regardless of whether authentication is started either from the child device including the authentication chip 300 or from the parent device including the authentication chip 200.

However, as a result of evaluating the security of the protocol illustrated in FIG. 6 with analyses unique to the present inventor, it was proved that a counterfeit can be manufactured by tapping or falsifying communication data on the I2C bus 400 with different attack methods 1 and 2 for the above described two types of methods even if a secret key is not learned. The attack methods 1 and 2 are described below with reference to FIGS. 7 and 8.

(Attack Method 1)

FIG. 7 illustrates the attack method (hereinafter referred to as the attack method 1) when tapping on the I2C bus 400 is used against the protocol of FIG. 6. An attack target is a protocol used when responses are generated by the parent device including the authentication chip 200 and the child device including the authentication chip 300 in this order. If the authentication chip 300 of the child device is a legal device, the CPU 100 receives the responses $R_P$ and $R_Q$ from the parent device and the child device in this order, and determines a legal device. In the meantime, an authentication chip of the child device, which is a counterfeit, behaves as follows. The counterfeit authentication chip 300' observes the response $R_P$ that the parent device returns to the CPU 100 via the I2C bus 400, and stores the response in an internal register (not illustrated) of the counterfeit authentication chip 300'. Next, the challenge C is transmitted from the CPU to the child device. Therefore, the authentication chip 300' returns the response $R_P$ observed with the tapping unchanged as the response $R_Q$ of the child device. In this way, the CPU receives the identical responses. Therefore, the responses $R_P$ and $R_Q$ match, so that the CPU 100 determines the counterfeit authentication chip as a legal one. As described above, it is sufficient that the counterfeit authentication chip simply taps data on the I2C bus with the attack method 1. Therefore, an attack is successfully made even if a value of a secret key is not learned.

(Attack Method 2)

Figure 8:
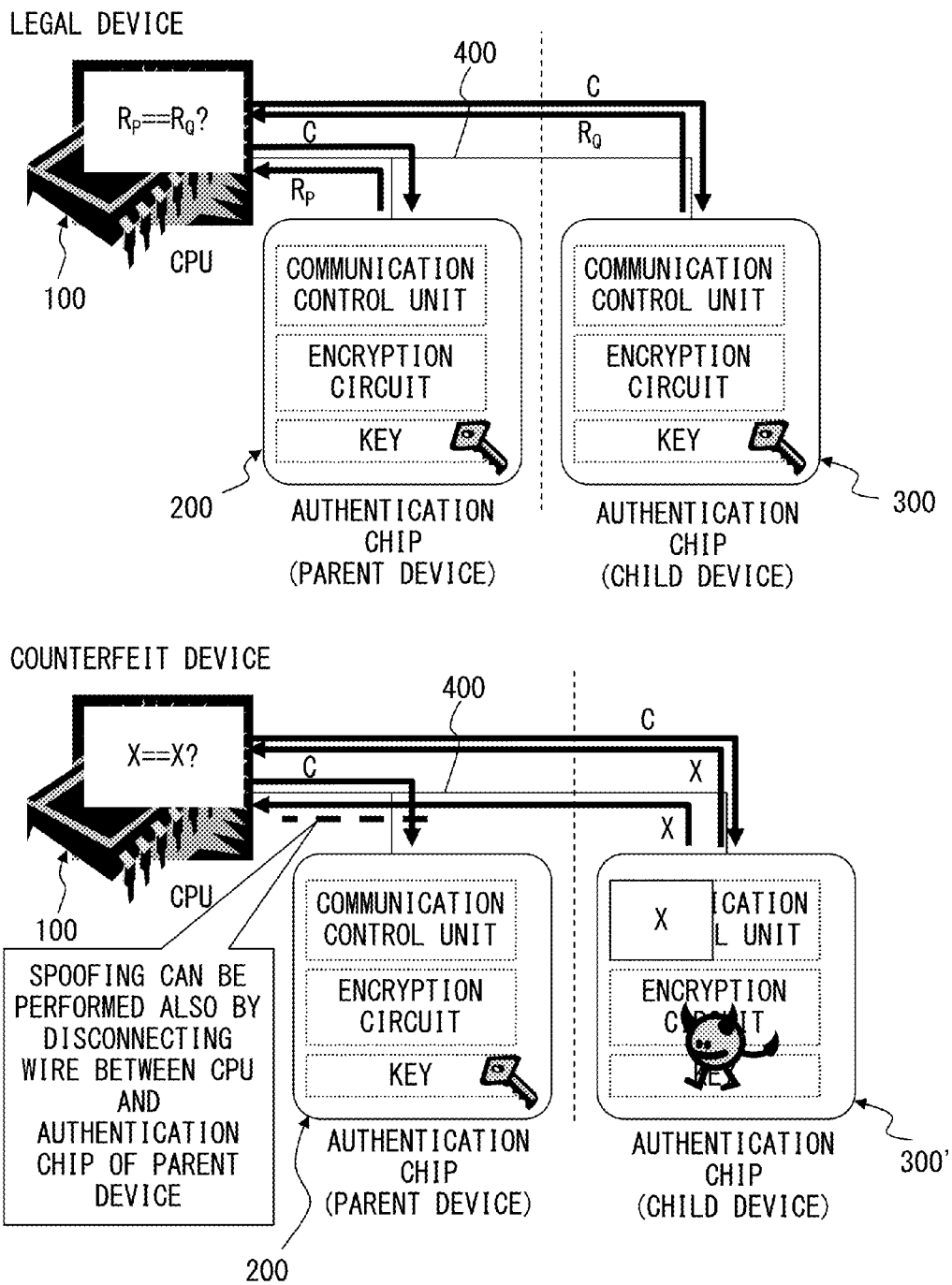
FIG. 8 illustrates an attack method using falsification.

FIG. 8 illustrates an attack method (hereinafter referred to as the attack method 2) when data is falsified against the protocol of FIG. 6. An attack target is a protocol used when responses are generated by the child device and the parent device in this order. If the authentication chip 300 of the child device is a legal one, the CPU 100 receives the responses $R_Q$ and $R_P$ from the child device and the parent device in this order, and determines a legal device. In contrast, an authentication chip 300' of the child device, which is a counterfeit, behaves as follows. The counterfeit authentication chip 300' generates an adequate value X, and returns the value as the response $R_Q$ to the challenge C from the CPU 100. X may be an arbitrary value. Next, the child device including the authentication chip 300' taps data on the I2C bus 400, and returns the generated value X as a replacement for the authentication chip 200 of the parent device (spoofing) when the challenge C is input from the CPU 100 to the parent device including the authentication chip 200. To implement this spoofing, communication processing timing on the side of the counterfeit authentication chip is very severe. However, this is feasible in principle. As a technique by which an attacker avoids the severity of this timing control, a method for disconnecting the communication line 400 between the CPU 100 and the authentication chip 200 of the parent device is cited. Although the circuitry on the parent device side needs to be physically modified, spoofing by the child device can be easily performed with the attack method 2, and a counterfeit can be erroneously recognized as a legal one.

As described above, in the comparison example, whether or not authentication is successfully performed is determined depending on whether or not the response $R_P$ from the parent device and the response $R_Q$ from the child device are equal. By using the attack method 1 that taps data or the attack method 2 that performs spoofing, security of authentication can be possibly threatened.

A system where a serial bus type connection is made based on Form 3 that satisfies the above described Constraints 1, 2, and 3 and security of authentication is improved is described below.

First Embodiment

An authentication system using common key cryptography according to a first embodiment of the present invention is described with reference to FIG. 9. This embodiment is also a fundamental embodiment of the present invention. This embodiment can implement a compact system that implements secure authentication even against the above described attack methods 1 and 2 in order to address the problem that the protocol of FIG. 6, which satisfies Constraints 1, 2, and 3, is vulnerable to the attack methods 1 and 2.

FIG. 9 illustrates the system according to the first embodiment of the present invention. In the above described comparison example, the authentication chip of the parent device and that of the child device return the identical responses. Therefore, an attack using tapping or spoofing is easy. In contrast, this embodiment is characterized in that a plurality of response generation units for generating a response to a challenge are prepared within an authentication chip, and any of the response generation units is selected based on information stored in a nonvolatile memory within the authentication chip included in the parent device and the child device. This information is information used to identify whether authentication chips of the parent device and the child device, which have the same hardware configuration, identify themselves as the authentication chip on the parent device side or that on the child device side. Normally, this information may be address information of an I2C bus. Namely, whether the authentication chip is either of the parent device or of the child device is decided based on an I2C address. If this address information is of the child device side, the child device returns a normal response (referred to as an output value) $R_Q=\text{Enc}(C,K)$. In contrast, if the address information is of the parent device side, the parent device side generates a response $R_P=F(\text{Enc}(C,K))$ obtained by transforming the normal response, namely, the output value with a function F. Note that the function F is a function made non-public to an outside. The CPU that has received these responses $R_P$ and $R_Q$ determines whether or not $F(R_Q)$ calculated from $R_Q$ is equal to $R_P$, and determines the child device as a legal device if $F(R_Q)$ is equal to R. If the response is returned by a legal device, $F(R_Q)=F(\text{Enc}(C,K))=R_P$, which results in an equal value. Since the response is transformed with the function F made non-public to an outside, an attack that performs spoofing for the CPU and makes the response values $R_P$ and $R_Q$ of the parent device and the child device identical with a method such as the attack method 1 or 2 is not applicable. Therefore, secure authentication can be implemented.

As illustrated in FIG. 9, the system according to this embodiment is a system where a parent device authenticates a child device. The system includes a CPU 100 included in the parent device, an authentication chip 200 of the parent device, an authentication chip 300 of the child device, and an I2C bus 400 that connects the CPU 100, the authentication chip 200 of the parent device, and the authentication chip 300 of the child device. The CPU 100, the authentication chip 200 of the parent device, and the authentication chip 300 of the child device are connected with a serial bus connection via the I2C bus 400. As a bus interface (I/F), the I2C bus can be taken as an example.

The CPU 100 generates a challenge C, which is a random number, and outputs the generated challenge C to the authentication chip 200 of the parent device and the authentication chip 300 of the child device. Preferably, the random number is an integer. The CPU 100 receives the response $R_P$ from the parent device, and the response $R_Q$ from the child device. Then, the CPU 100 authenticates the child device by making a comparison between $F(R_Q)$, which is obtained by operating the function F for the response $R_Q$ from the child device, and the response R. Namely, the CPU 100 stores the function F that compensates for a difference between the response $R_P$ from the parent device and the response $R_Q$ from the child device. In this embodiment, the function F operated for the response R in the authentication chip 200 of the parent device, and that operated for the response $R_Q$ from the child device in the CPU are the same function.

The random number may be generated by a random number generator included in the CPU 100. Preferably, the random number is an integer. An output (transmission) of the challenge C to an outside may be performed by a random number transmitter. Reception of a response may be performed by a response value receiver. Moreover, the CPU 100 is configured to perform child device authentication process for making a comparison between the response $R_P$ from the parent device and the response $R_Q$ from the child device, and for determining whether or not the child device is a legal device.

Preferably, the authentication chip 200 of the parent device and the authentication chip 300 of the child device have the same configuration in terms of the above described Constraint 2. The authentication chips 200 and 300 respectively include a first response generation unit 220a, 320a, a second response generation unit 220b, 320b, a response selection unit 230, and an address information holding unit 240, 340.

The first response generation unit 220a, 320a stores an encryption function, and generates an output value R as a response by operating the encryption function for an input (challenge C) from the CPU 110 and a key similarly to conventional techniques. The encryption function may be a known one. The first response generation unit 220a, 320a is also referred to as an encryption calculator. The second response generation unit 220b, 320b stores the function F, and generates a number F(R) different from the output value R by further operating the function F for the output value R obtained by operating the encryption function for the input (challenge C) from the CPU 100 and the key. The second response generation unit 220b, 320b is also referred to as first response value generator. The address information holding unit 230, 340 may be a nonvolatile memory for storing an address specific to each authentication chip. The authentication chip 200 of the parent device and the authentication chip 300 of the child device include, in addition to the above described components, a communicator (not illustrated) that receives a signal from an external device such as the CPU 100 or the like, and for transmitting a signal to the external device. Examples of the communicator include a data input/output interface (I/F) 260, 360 illustrated in FIG. 10. The data input/output interface (I/F) functions as a receiver that receives a random number generated by the processor (CPU) 100, or as a transmitter that transmits a response generated by the response generation unit to the processor (CPU) 100.

In this embodiment, a key is a common key (also referred to as a secret key). Namely, the first response generation unit 220a, 320a executes an algorithm of common key cryptography. The response selection unit 230, 330 selects a response generation unit according to an address value of a serial bus, which is stored in the address information holding unit 240, 340. The first response generator and the second response generator form a response value generator.

The above provided description assumed that the authentication chip 300 of the child device returns the normal response $R_Q$=Enc(C,K) to the challenge C input from the CPU 100. Also the authentication chip 300 of the child device may return H(Enc(C,K)) obtained by operating a certain function H for Enc(C,K). Also in this case, the above described authentication method functions if the CPU 100 stores a function that compensates for a difference between the response $R_P$ from the parent device and the response $R_Q$ from the child device. Preferably, the function that compensates for the difference between the response $R_P$ and the response $R_Q$ is decided uniquely from address information stored in the memory 240 of the authentication chip 200 of the parent device, and that stored in the memory 340 of the authentication chip 300 of the child device. The memory 240, 340 configure address storages.

The authentication chip 200 of the parent device and the authentication chip 300 of the child device have the same configuration. A chip used as the authentication chip 200 of the parent device or a chip used as the authentication chip 300 of the child device may be set at the time of shipment so that the second response generation unit 220b or the first response generation unit 230a functions. Setting the chips at the time of shipment in this way offers advantages such that the same chip can be mass-produced as authentication chips, and a high level of security can be secured due to the settings made at the time of shipment.

By employing such a configuration, the authentication system 10 can improve the security of authentication since a response from the authentication chip 200 of the parent device and that from the authentication chip 300 of the child device are different even if the bus 400 is an I2C bus.

Additionally, the authentication chip 200 of the parent device and the authentication chip 300 of the child device have the same configuration in this embodiment. Moreover, the CPU 100, the authentication chip 200 of the parent device, and the authentication chip 300 of the child device are connected by the I2C bus. By employing such a configuration, only one communication port that each of the authentication chips 200 and 300 includes for a communication with an outside is sufficient, whereby the authentication chips can be manufactured in a compact size while reducing a manufacturing cost.

Furthermore, in each of the authentication chips, a transform function is made non-public to an outside, namely, stored in a nonvolatile memory. Accordingly, high security can be achieved.

Second Embodiment

A second embodiment according to the present invention is described with reference to FIGS. 10 to 12.

In the system 10 according to this embodiment, a maximum of n child devices are connected to a parent device. The parent device includes the CPU 100, and the authentication chip (authentication chip 0) 200. Each of the n child devices includes one authentication chip (authentication chip 1 to n) 300_1, . . . , 300_n. n is an arbitrary natural number. A plurality of authentication chips are sometimes connected to the child device side depending on an application purpose. For example, if ink cartridges of four colors are used, the child device includes one authentication chip for each of the colors. Namely, the child device includes a total of four authentication chips. The authentication chips 300_1, . . . , 300_n have the same hardware configuration, and an address value of a serial bus is written in the nonvolatile memory 326 within each of the chips. This address value is a value used to distinguish a communication entity on the serial bus, and a unique value is assigned to each of the CPU 100 and the authentication chips 300_1, . . . , 300_n. It is sufficient that this address uniqueness is maintained among communication entities connected to the serial bus 400 of FIG. 13. It is not needed that all distributed authentication chips respectively have different values.

The CPU 100 of the parent device transmits a challenge C to each of the authentication chips 0 and i in order to verify whether or not an ith child device is a legal device, and makes a comparison between a response $R_Q$ from the authentication chip i and a response $R_P$ from the authentication chip 0. The authentication chips respectively include n+1 data transformers. The authentication chips respectively include a response generation circuit 224 for generating a response R from the received challenge C by using a secret key stored in a memory 226, s 220a-n for performing a transform 0-n, a memory 240 for storing address information as a parameter of a transform function, and a selector 223 for selecting one of the s 220a to n based on the address information stored in the memory 240. The s 220a to n respectively store the transform function of the transform 0 to n.

Assuming that an input to and an output from the data transformer selected by the ith authentication chip are respectively X and Y, $Y=F^{ti}(X)$ can be taken by using the function F as an example of a relationship between X and Y. Note that $Y=F^Z(X)$ is a result obtained by applying X to the function F sequentially by z times. By way of example, if $F(X)=X+1$, $F^1(10)=F(10)=10+1=11$, $F^2(10)=F(F(10))=12$, $F^4(10)=14$, and $F^0(10)=10$. Note that $t_i$ is a constant decided based on the address information stored in the memory 240, and indicates the number of times that the function F corresponding to the transformer used by the ith authentication chip is repeatedly applied. The function F(X) may be any function as far as it is a 1-input 1-output function, which is made non-public to an outside. Considering a hardware implementation of the function (X), the smallest possible circuitry scale is preferable. For example, the following process is preferable.
(1) Repeating a shift process executed by a feedback shift register (LFSR) by the number of bits of a constant.
(2) Repeating a modulo operation process of a characteristic polynomial in a Galois extension field $GF(2^m)$ having $2^m$ elements after a 1-bit left shift.
(3) Hash function
For example, the above described (1) is $$F(X)=LFSR(X,128)$$

Note that LFSR(X,1) includes a value obtained by shifting X by 1 bit with the LFSR (linear feedback shift register) process.
For example, the above described (2) is $$F(X)=X^{64} \bmod q(X)$$

where q(X) indicates a 128-bit irreducible polynomial, and mod indicates a remainder.

For example, the above described (3) is the lowest-order 128 bits of F(X)=SHA1(X). Note that SHA(X) is an output of a SHA-1 hash function of X.

Specific examples of (1) to (3) are not limited to the above described functions as a matter of course.

Differences among the transformer are those only in the number of times that the same function is repeated. Therefore, only a circuit for processing the function F needs to be mounted in an authentication chip, and there is no need to mount different circuits respectively for the n+1 transformer. As a result, a manufacturing cost can be reduced.

The CPU 100 of the parent device, which has received the responses $R_P$ and $R_Q$ from the authentication chips 0 and i, makes a comparison between these responses as follows.
In case of $t_i > t_0$: the child device is determined to be a legal one if $F^{ti-t0}(R_P)=R_Q$. Otherwise, the child device is determined to be a counterfeit.
In case of $t_i < t_0$: the child device is determined to be a legal one if $R_P=F^{t0-ti}(R_Q)$. Otherwise, the child device is determined to be a counterfeit.

The reason why the above described comparison is correct is that $R_P=F^{t0}(R)$ and $R_Q=F^{ti}(R)$ in a case of a legal device, and $F^{ti-t0}(R_P)=F^{ti-t0}(F^{t0}(R))=F^{ti}(R)$ matches $R_Q$ if $t_i > t_0$, or $F^{t0-ti}(R_Q)=F^{t0-ti}(F^{ti}(R))=F^{t0}(R)$ matches $R_P$ if $t_i < t_0$.

Figure 10:
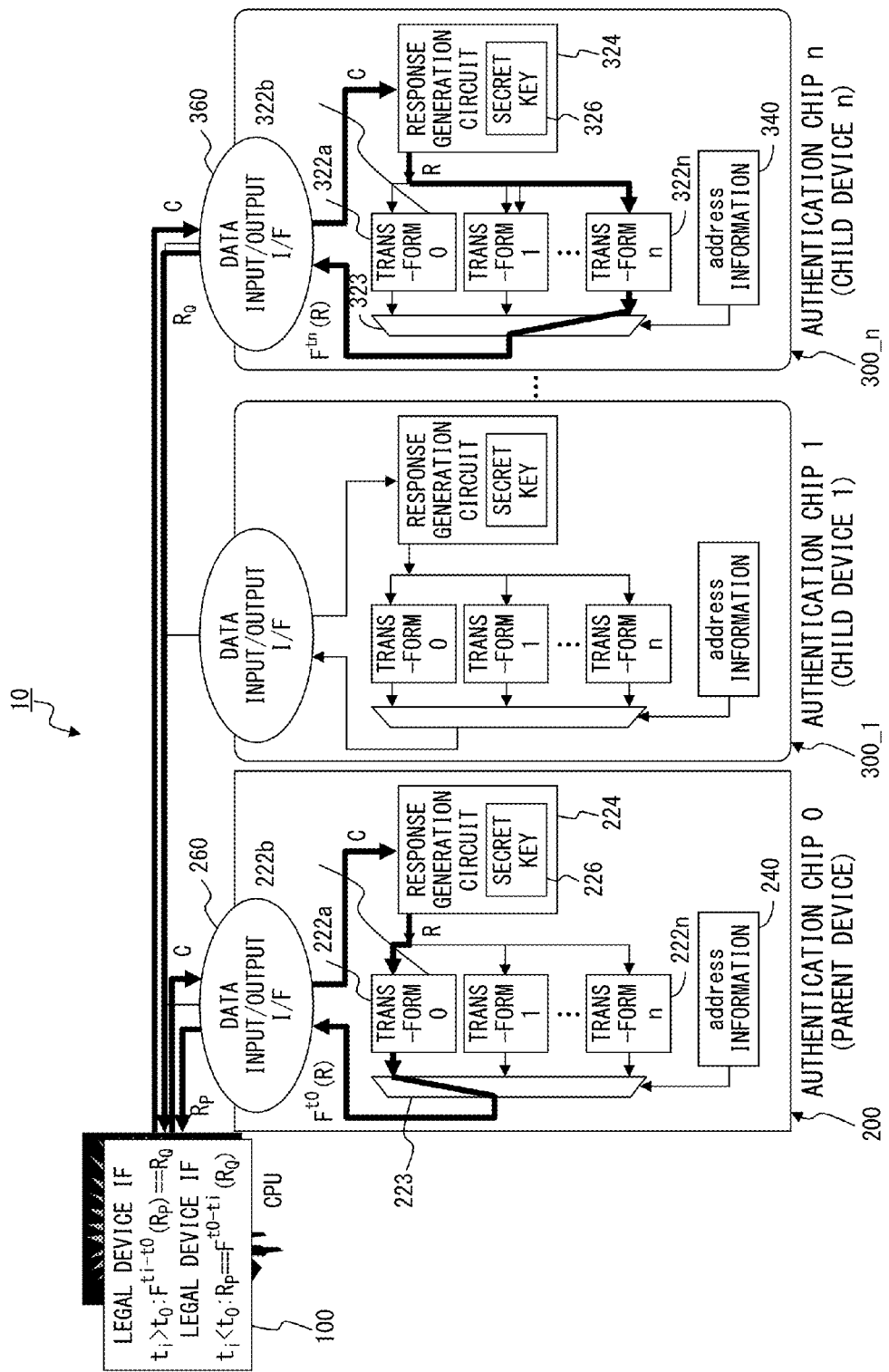
FIG. 10 illustrates a system according to a second embodiment of the present invention.

FIG. 10 illustrates the system 10 according to the second embodiment of the present invention. Similarly to the system illustrated in FIG. 9, this system 10 includes the CPU 100 included in the parent device, the authentication chip 200 of the parent device, the authentication chips 300_1, . . . , 300_n of the child devices, and the bus 400 for connecting the CPU 100, the authentication chip 200 of the parent device, the authentication chips 300 of the child devices. The CPU 100, the authentication chip 200 of the parent device, and the authentication chips 300 of the child devices are connected with an I2C serial bus connection via the bus 400.

A 0th authentication chip 200 (hereinafter referred to also as an authentication chip 0) included in the parent device includes a data input/output interface (I/F) 260 for receiving a signal from the CPU 100 and transmitting a signal to the CPU 100 via the bus 400, a response generation circuit 224 for generating an output value R as a response by operating the encryption function for the challenge C received by the data input/output interface (I/F) 260, calculation units 222a to n for operating a transform 0 to n for the output value R generated by the response generation circuit 224, the memory 240 for storing address information as a parameter of a transform function, and the selector 223 for selecting one of the calculation units 222a to n based on address information stored in the memory 240. The selector 223 corresponds to a response selection unit. The response generation circuit 224 includes a memory 226 for storing a secret key. The system illustrated in FIG. 9 is a system where the number of child devices is one. The first response generation unit 220a of FIG. 9 is equivalent to the response generation circuit 224, the calculation unit 222a for performing the transform 0, and the selector 223. The calculation units 220a to n, the selector 223, the response generation circuit 224, and the memory 240 for storing address information form a response value generator.

Also the authentication chips 300_1, . . . , 300_n of the child device have a configuration similar to that of the authentication chip 200 of the parent device. Namely, each of the authentication chips 300_1, . . . , 300_n includes a data input/output interface (I/F) 360 for receiving a signal from the CPU 100 and transmitting a signal to the CPU 100 via the bus 400, a response generation circuit 324 for generating an output value R as a response by operating the encryption function for the challenge C received by the data input/output I/F 360, calculation units 322a-n for operating a transform 0-n for the response generated by the response generation circuit 324 for generating a response R, a memory 340 for storing address information as a parameter of a transform function, and a selector 223 for selecting one of the calculation units 322a-n based on the address information stored in the memory 340. The response generation circuit 324 includes a memory 326 for storing a secret key. The second response generation unit 320b of FIG. 9 is equivalent to the response generation circuit 324, the calculation unit 322b for performing the transform 1, and the selector 323. The calculation units 320a-n respectively store the transform function F of the transforms 0-n. The calculation units 320a-n, the selector 323, the response generation circuit 324, and the memory 340 for storing address information form a response value generator.

Each of the selectors 223, 323 functions also as a response selection unit for selecting a transform function according to an address value of a serial bus, which is stored in the memory 240, 340.

The bus 400 is an I2C bus in this embodiment. By using the I2C bus, a connection between the CPU and the authentication chips can be simplified, thereby enabling cost reductions in the entire system.

Figure 11:
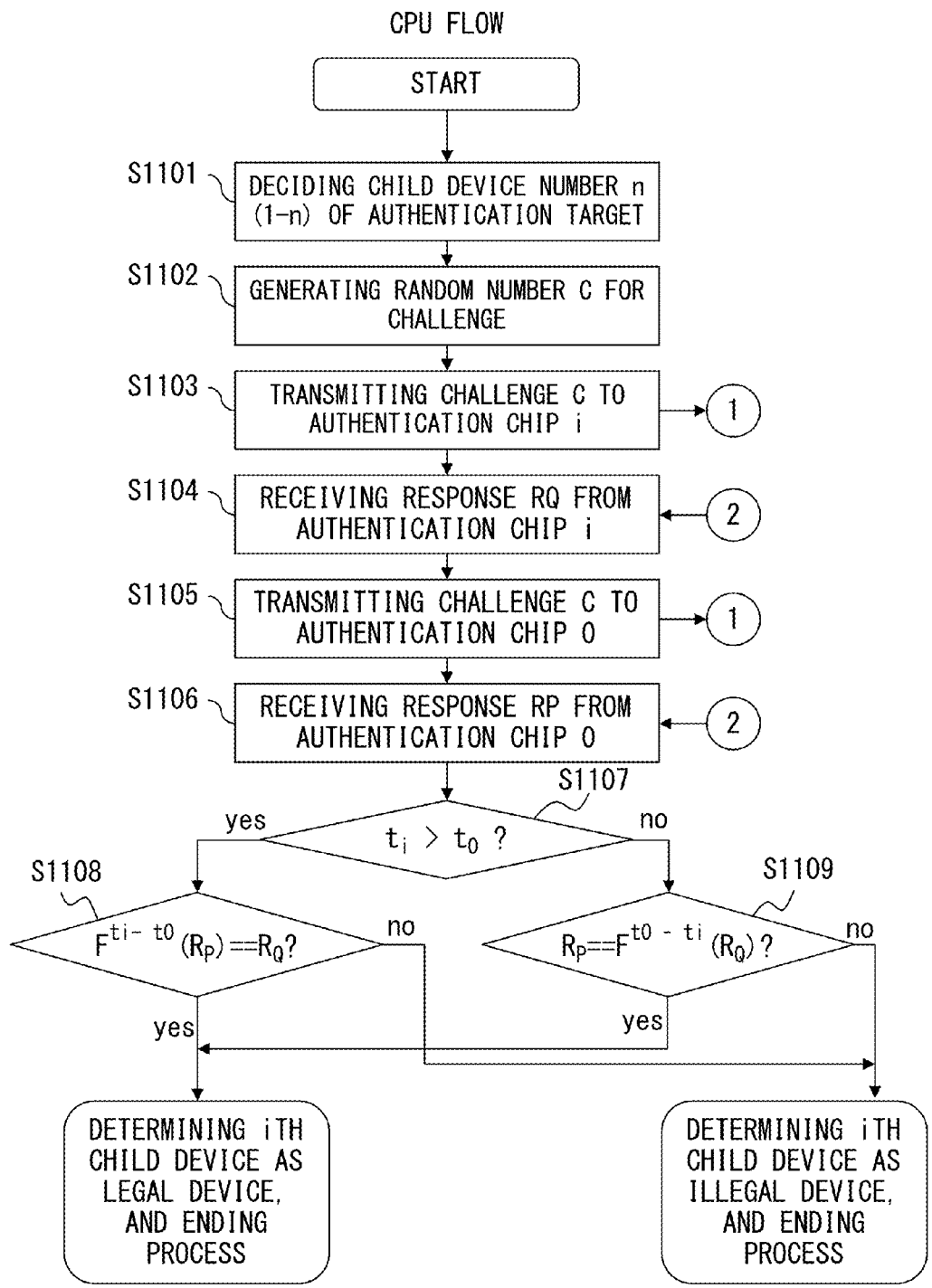
FIG. 11 is a flowchart illustrating a process executed by a CPU of the system according to the second embodiment of the present invention.
Figure 12:
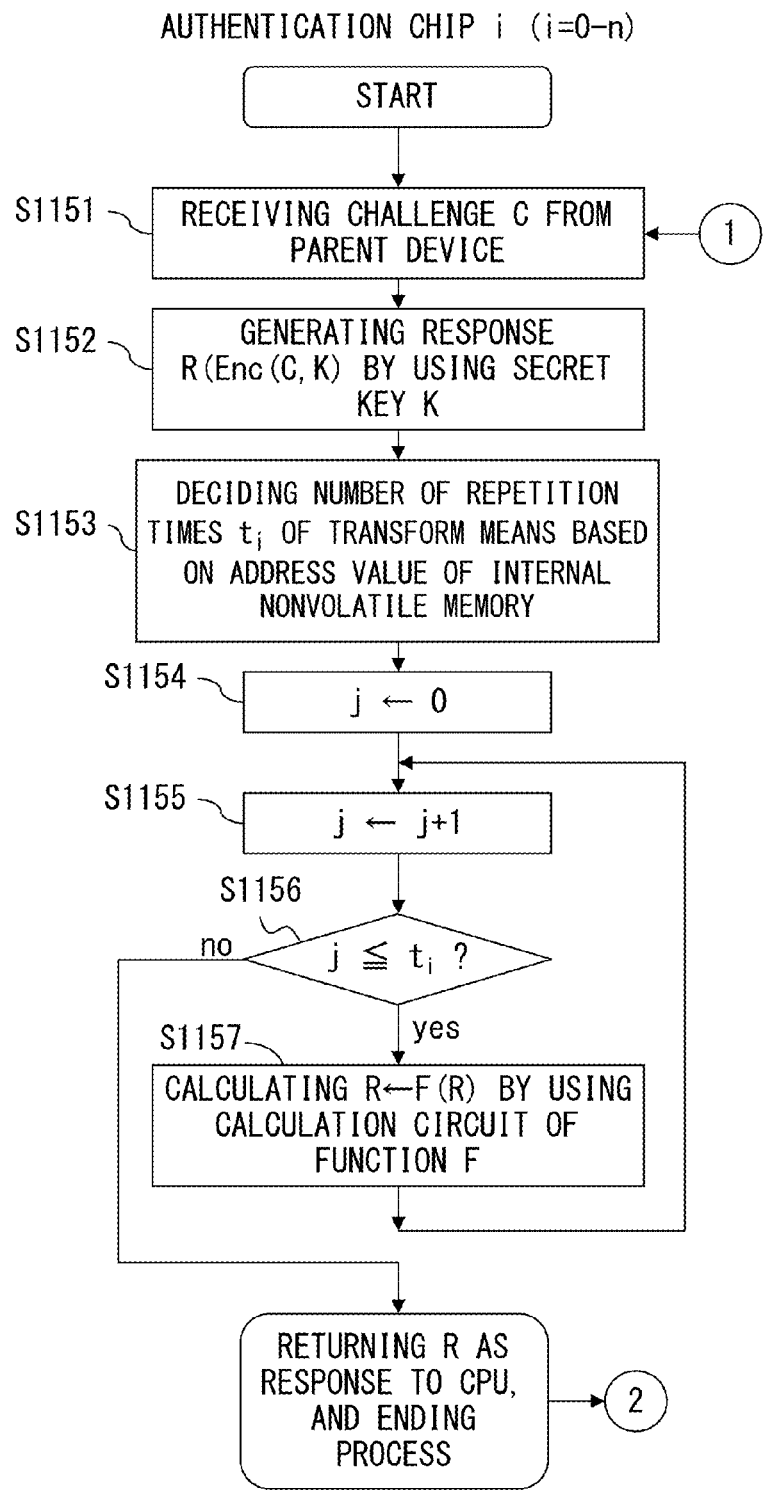
FIG. 12 is a flowchart illustrating a process executed by an authentication chip of the system according to the second embodiment of the present invention.

FIG. 11 is a flowchart illustrating a process executed by the CPU 100 of the system 10 according to the second embodiment of the present invention. FIG. 12 is a flowchart illustrating a process executed by the authentication chip of the system according to the second embodiment of the present invention.

The CPU 100 decides a child device number i of an authentication target in S1101. Then, the flow proceeds to S1102. In S1102, a random number is generated to be used as a challenge C. In S1103 next to S1102, the challenge C generated in S1102 is transmitted to the authentication chip 300_i of the ith child device decided in S1101.

In the authentication chip 300_i of the ith child device, the challenge C transmitted from the CPU 100 of the parent device is received in S1151. Next, in S1152, an output value R=Enc(C, K) as a response is generated by using the secret key K stored in the secret key storage unit 326 within the response generation circuit 324 of the authentication chip 300_i, and the challenge C. In S1153, the number of repetition times $t_i$ of the transform is decided based on the address information stored in the internal nonvolatile memory 340. The number of repetition times $t_i$ may be, for example, an integer created by sequentially arranging numbers that appear at an address. In S1154 to S1157 subsequent to S1153, the function F is operated for the response R by $t_i$ times. More specifically, 0 is assigned to a dummy variable j, which is an integer, in S1154. The value of the dummy variable is incremented by 1 in S1155, and a comparison is made between j and $t_i$ in S1156. If j is smaller than $t_i$ in S1156, the response value is updated by operating the function F for the current response value in S1157. Then, the flow returns to S1154. If j is larger than $t_i$ in S1156, the current value of the response R is transmitted to the CPU 100, and the process of the authentication chip 300_i of the ith child device is terminated.

The CPU 100 receives the value of the response R from the authentication chip 300_i of the ith child device as a response $R_Q$ in S1104. Next, the challenge C is transmitted to the authentication chip 200 of the parent device in S1105.

In the authentication chip 200 of the parent device, the same process as the above described process of the authentication chip 300_i of the ith child device is executed. However, the number of times that the function F is operated is t0, which is different from $t_i$ in the case of the authentication chip 300_i of the ith child device.

The CPU 100 receives the value of the response R from the authentication chip 200 of the parent device as a response $R_P$ in S1106. Next, a comparison is made between $t_i$ and $t_0$ in S1107. If $t_i$ is larger than $t_0$, the flow proceeds to S1108. Otherwise, the flow proceeds to S1109. In S1108, whether or not the value obtained by operating the function F for $R_P$ by $t_i - t_0$ times and $R_Q$ are equal. If they are equal, the ith child device is determined as a legal device, and the process of the CPU 100 is terminated. Otherwise, the ith child device is determined as an illegal device. In S1109, whether or not a value obtained by operating the function F for $R_Q$ by $t_0 - t_i$ times and $R_P$ are equal is determined, and the process of the CPU 100 is terminated. If they are equal, the ith child device is determined as a legal device, and the process of the CPU 100 is terminated. Otherwise, the ith child device is determined as an illegal device, and the process of the CPU 100 is terminated.

Since the responses $R_P$ and $R_Q$ are different in the system 10 according to this embodiment by employing such a configuration, an attack using tapping or counterfeiting as referred to in the attack methods 1 and 2 can be prevented.

Third Embodiment

Figure 13:
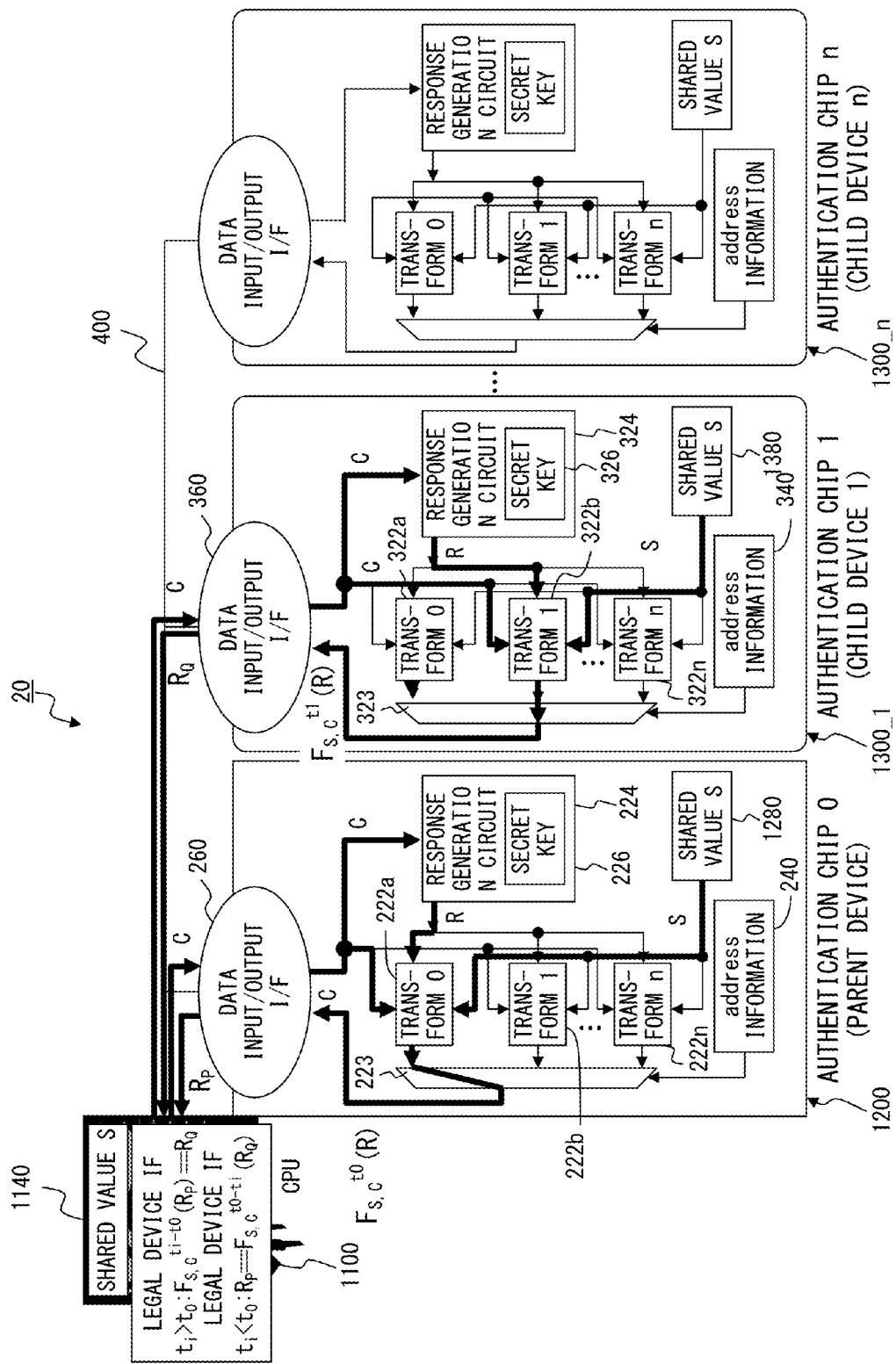
FIG. 13 illustrates a system according to a third embodiment of the present invention.
Figure 14:
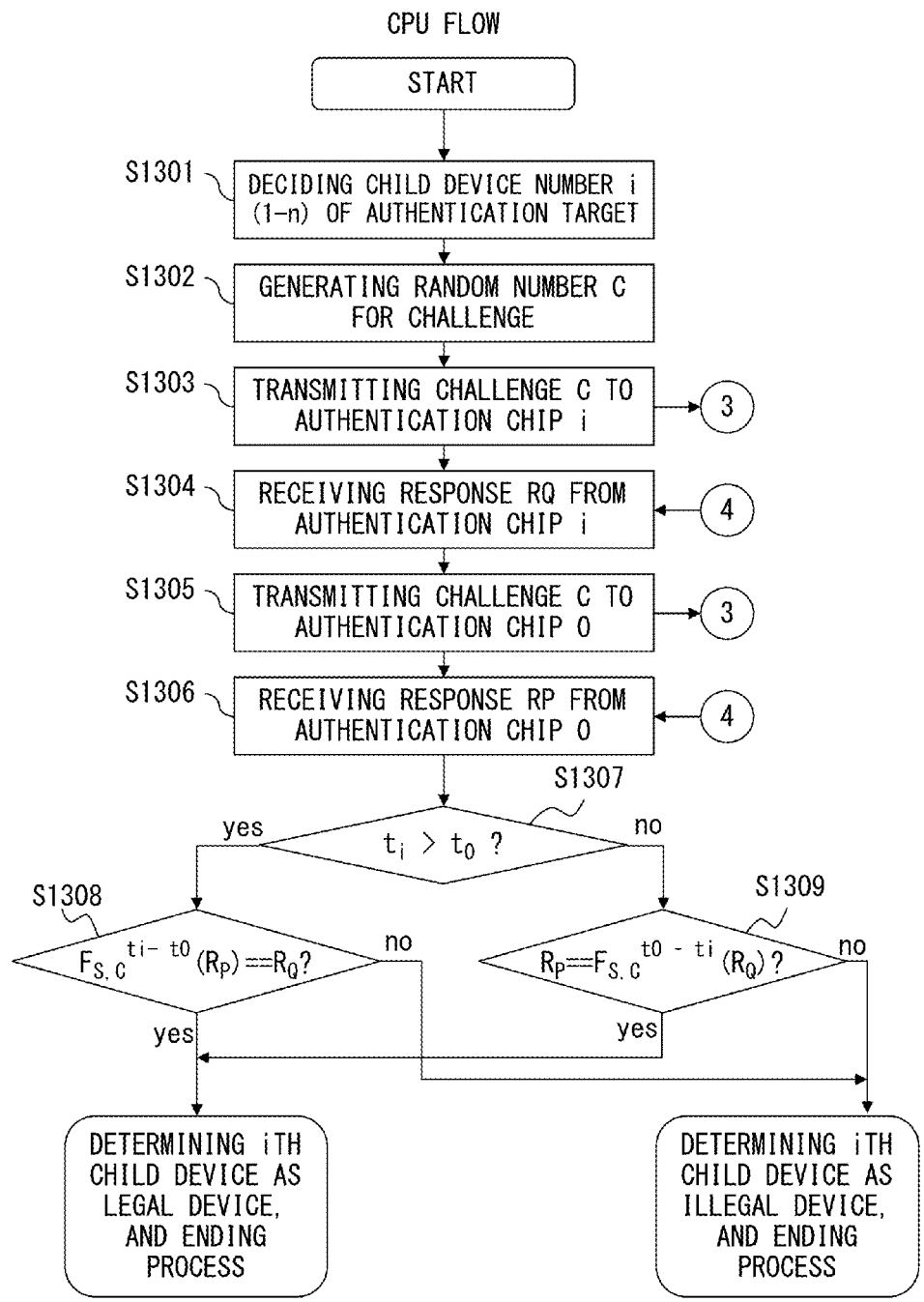
FIG. 14 is a flowchart illustrating a process executed by a CPU of the system according to the third embodiment of the present invention.
Figure 15:
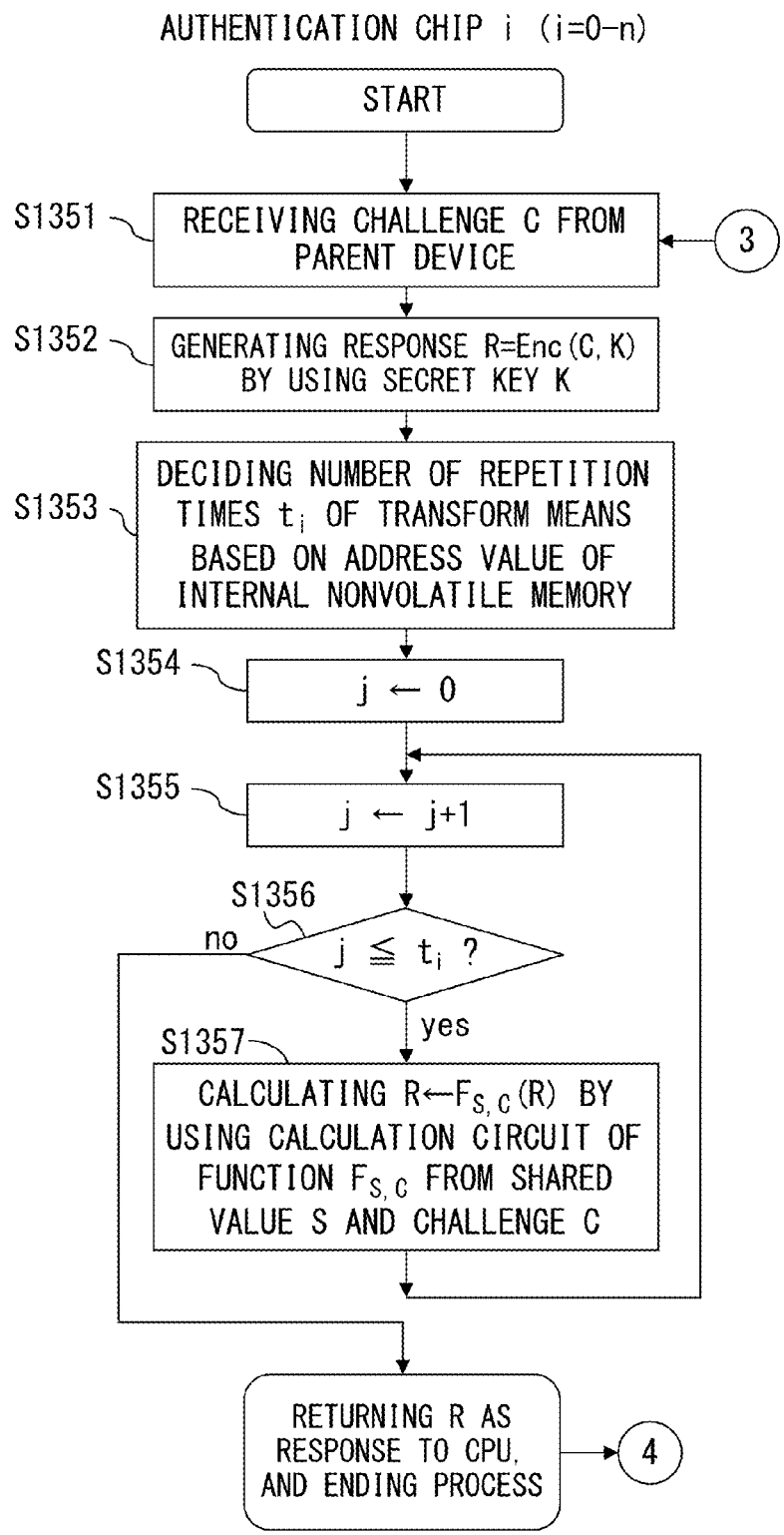
FIG. 15 is a flowchart illustrating a process executed by an authentication chip of the system according to the third embodiment of the present invention.

An authentication system 20 according to a third embodiment is described with reference to FIGS. 13 to 15. FIG. 13 illustrates the system 20 according to this embodiment. FIG. 14 is a flowchart illustrating a process executed by a CPU 1100 of the system according to this embodiment. FIG. 15 is a flowchart illustrating a process executed by authentication chips 1200 and 1300_i of the system 20 according to this embodiment.

In the system 10 according to the second embodiment, types of the function F that can efficiently execute a process on hardware are significantly limited although the function F is not made public. Therefore, a possibility that correct contents of F are identified based on a result of data tapping is not zero. When contents of the function F are identified by an attacker, a counterfeit can be manufactured by using an attack method changed to return a response transformed with the function F based on an idea similarly to the attack methods 1 and 2 even if an attacker does not learn the value of a secret key. This embodiment provides the system 20 that makes it more difficult to identify transform function by tapping of communication data.

The authentication system 20 according to this embodiment is fundamentally the same as the system 10 according to the second embodiment. However, authentication chips 1300_1 to 1300_n (authentication chips 1-n) include a nonvolatile memory 1280, 1380 in which a constant S (shared value S) shared in advance is written. The constant S is a value written when the CPU 1100, and the authentication chips 1200 and 1300_1 to 1300_n are manufactured. Assuming that an input to and an output from data transformer selected by the ith authentication chip are respectively X and Y, a relationship between X and Y can be represented as $Y = F_{S,C}^{ti}(X)$ by using a function $F_{S,C}$. $F_{S,C}(X)$ represents a 1-input 1-output function that uses the constant S and the challenge C as parameters. For example, the following calculations are cited.

(4) XOR addition with parameters
(5) modulo operation with parameters
(6) hash operation with parameters
(7) LFSR-XOR operation with parameters For example, the above described (4) is $$F_{S,C}(X) = (S+X) \oplus C$$

For example, the above described (5) is $$F_{S,C}(X) = (S\|C\|X) \bmod q(X)$$

where ||, q(X), and mod are a bit concatenation, a 128-bit irreducible polynomial, and a remainder, respectively.

For example, the above described (6) is the lowest-order 128 bits of $$F_{S,C}(X) = SHA1(S \oplus C \oplus X)$$

For example, the above described (7) is $$F_{S,C}(X) = LFSR(S,19) \oplus LFSR(C,42) - LFSR(X,21)$$

Specific examples of (4) to (7) are not limited to the above described functions.

Since the transformer is influenced by the challenge C and the constant S that cannot be externally observed, variations of the transform significantly increase. Thus, it becomes difficult for an attacker to decrypt the transformer by using the above described tapping of communication data. For example, by setting S as a 128-bit parameter, a total number of round-robin combinations to be attempted by an attacker results in $2^{128}$, which cannot be decrypted in a real time frame. Namely, by using the system 20 according to this embodiment, an attack that uses decryption of transformer and is made by tapping communication data can be avoided. Moreover, in the system 20 according to this embodiment, security can be ensured even if an attacker performs advanced reverse engineering for the CPU 1100 to decrypt processing contents of the function F.

The CPU 1100 of the system 20 according to this embodiment is the same as the CPU 100 according to the second embodiment except that it includes the memory 1140 for storing a shared value.

The authentication chip 1200 of the parent device has a configuration similar to the authentication chip 200 of the parent device in the second embodiment. However, the authentication chip 1200 is different from the authentication chip 200 in that the authentication chip 1200 includes the nonvolatile memory 1280 for storing the shared value S.

The authentication chips 1300_1, ..., 1300_n of the child devices have a configuration similar to the authentication chip 300 of the child device in the second embodiment. However, the authentication chips 1300_1, ..., 1300_n are different from the authentication chip 300 in that they include the memory 1380 for storing the shared value S. Moreover, the authentication chips 1300_1, ..., 1300_n have the same configuration as that of the authentication chip 1200 of the parent device.

FIG. 14 is a flowchart illustrating a process executed by the CPU 1100 of the system according to the third embodiment of the present invention. FIG. 15 is a flowchart illustrating a process executed by the authentication chip of the system according to the third embodiment of the present invention.

The CPU 1100 decides a child device number i of an authentication target in S1301. Then, the flow proceeds to S1302. In S1302, a random number is generated to be used as a challenge C. In S1303 next to S1302, the challenge C generated in S1302 is transmitted to the authentication chip 1300_i of the ith child device decided in S1301.

In the authentication chip 1300_i of the ith child device, the challenge C transmitted from the CPU 1100 of the parent device is received in S1351. Next, in S1352, an output value R=Enc(C,K) as a response is generated by using a secret key K stored in the secret key storage unit 326 within the response generation circuit 324 of the authentication chip 1300_i, and the challenge C. In S1353, the number of repetition times $t_i$ of the transform is decided based on address information stored in the internal nonvolatile memory 340. Similarly to the second embodiment, the number of repetition times $t_i$ may be, for example, an integer obtained by sequentially arranging numbers that appear at an address. In S1354 to S1357 subsequent to S1353, the function $F_{S,C}$ is operated for the output value R. The function $F_{S,C}$ is decided based on the shared value S and the challenge C. More specifically, 0 is assigned to a dummy variable j, which is an integer, in S1354. The value of the dummy variable is incremented by 1 in S1355, and a comparison is made between j and $t_i$ in S1356. If j is equal to or smaller than $t_i$ in S1356, the response value is updated by operating the function $F_{S,C}$ for the current response value in S1357. Then, the flow returns to S1354. If j is larger than $t_i$ in S1356, the current value of the response R is transmitted to the CPU 1100. Here, the process of the authentication chip 1300_i of the ith child device is terminated.

The CPU 1100 receives the value of the response R from the authentication chip 1300_i of the ith child device as a response $R_Q$ in S1304. Next, the CPU 1100 transmits the challenge C to the authentication chip 1200 of the parent device in S1305.

The authentication chip 1200 of the parent device executes the same process as the above described process of the authentication chip 1300_i of the ith child device. However, the number of times that the function $F_{S,C}$ is operated is $t_0$, which is different from $t_i$ in the case of the authentication chip 1300_i of the ith child device.

The CPU 1100 receives the value of the response R from the authentication chip 1200 of the parent device as a response $R_P$ in S1306. Next, a comparison is made between $t_i$ and $t_0$ in S1307. If $t_i$ is larger than $t_0$, the flow proceeds to S1308. Otherwise, the flow proceeds to S1309. In S1308, whether or not a value obtained by operating the function $F_{S,C}$ for $R_P$ by $t_i - t_0$ times and $R_Q$ are equal is determined. If they are equal, the ith child device including the authentication chip 1300_i is determined as a legal device. Otherwise, the ith child device is determined as an illegal device. In S1309, whether or not a value obtained by operating the function $F_{S,C}$ for $R_Q$ by $t_0 - t_i$ times and $R_P$ are equal is determined, and the process of the CPU 100 is terminated. If they are equal, the ith child device including the authentication chip 1300_i is determined as a legal device, and the process of the CPU 100 is terminated. Otherwise, the ith child device is determined as an illegal device, and the process of the CPU 100 is terminated.

As described above, there is a possibility that the system 10 according to the second embodiment is vulnerable to an attack that completely identifies contents of the transformers 0-n by using data tapping on a serial bus while an attacker is estimating rough contents of the function F. Since the function F needs to be an efficient process when implemented as hardware, means of the function are limited to LFSR, an addition, XOR, a modulo operation, a hash function, and the like. Accordingly, an attacker can determine whether or not his or her estimation is actually correct by using tapping of data on a serial bus while he or she is estimating the function F as any or a combination of the above described operations. For example, if the authentication chips 0 and 1 are used and $t_0 = 0$ and $t_1 = 1$ are set, $R_P = R$ and $R_Q = F(R)$. These $R_P$ and $R_Q$ are values that also an attacker can easily observe. At this time, there was a possibility that the attacker estimates calculation contents of F, and can verify whether or not his or her estimation is actually correct by judging whether or not k=F($R_P$) is satisfied based on the tapped $R_P$ and $R_Q$. However, in the system 20 according to this embodiment, the transformer is influenced by the challenge C, and the constant S that cannot be observed from an outside, so that variations of the transform can be significantly increased. As a result, it becomes difficult for an attacker to decrypt the transformer by using the above described tapping of communication data. For example, by setting the constant S as a 128-bit parameter, a total number of round-robin combinations to be attempted by the attacker is $2^{128}$, which cannot be decrypted in a real time frame. Namely, by using the system 20 according to this embodiment, resistance to an attack using decryption of transformer by tapping communication data in the system 10 according to the second embodiment can be further improved.

Fourth Embodiment

An authentication system 30 according to a fourth embodiment of the present invention is described with reference to FIGS. 16 to 20.

Figure 17:
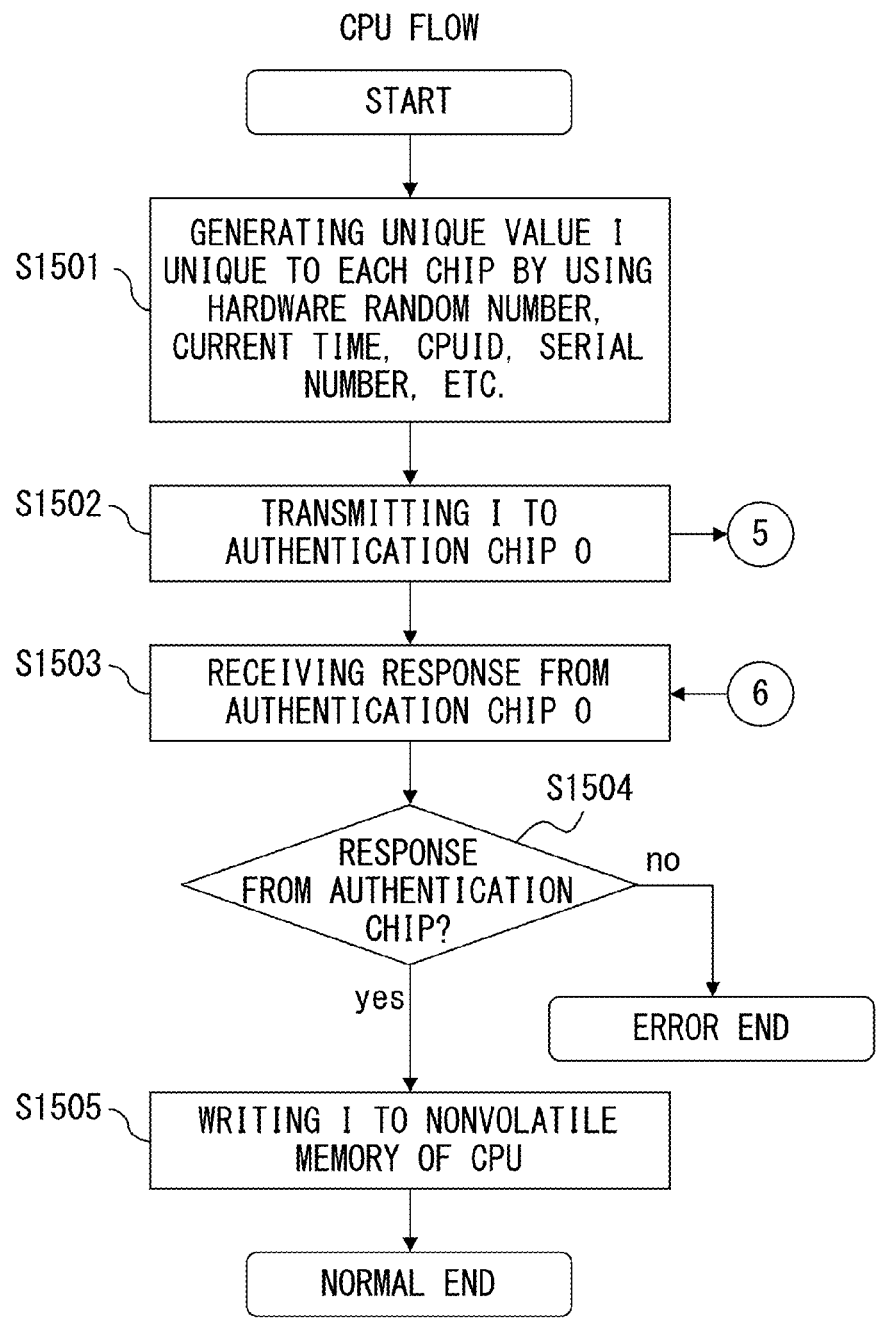
FIG. 17 is a flowchart illustrating a process executed by a CPU when an authentication chip 0 is mounted in the CPU in the system according to the fourth embodiment of the present invention.
Figure 18:
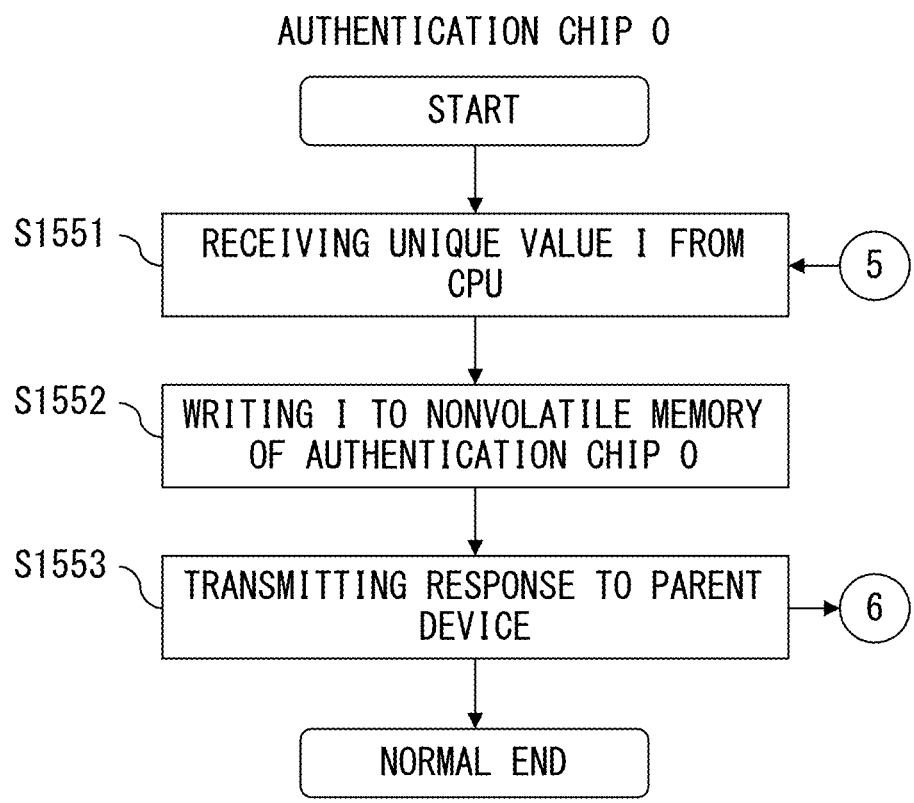
FIG. 18 is a flowchart illustrating a process executed by the authentication chip 0 when the authentication chip 0 is mounted in the CPU in the system according to the fourth embodiment of the present invention.
Figure 19:
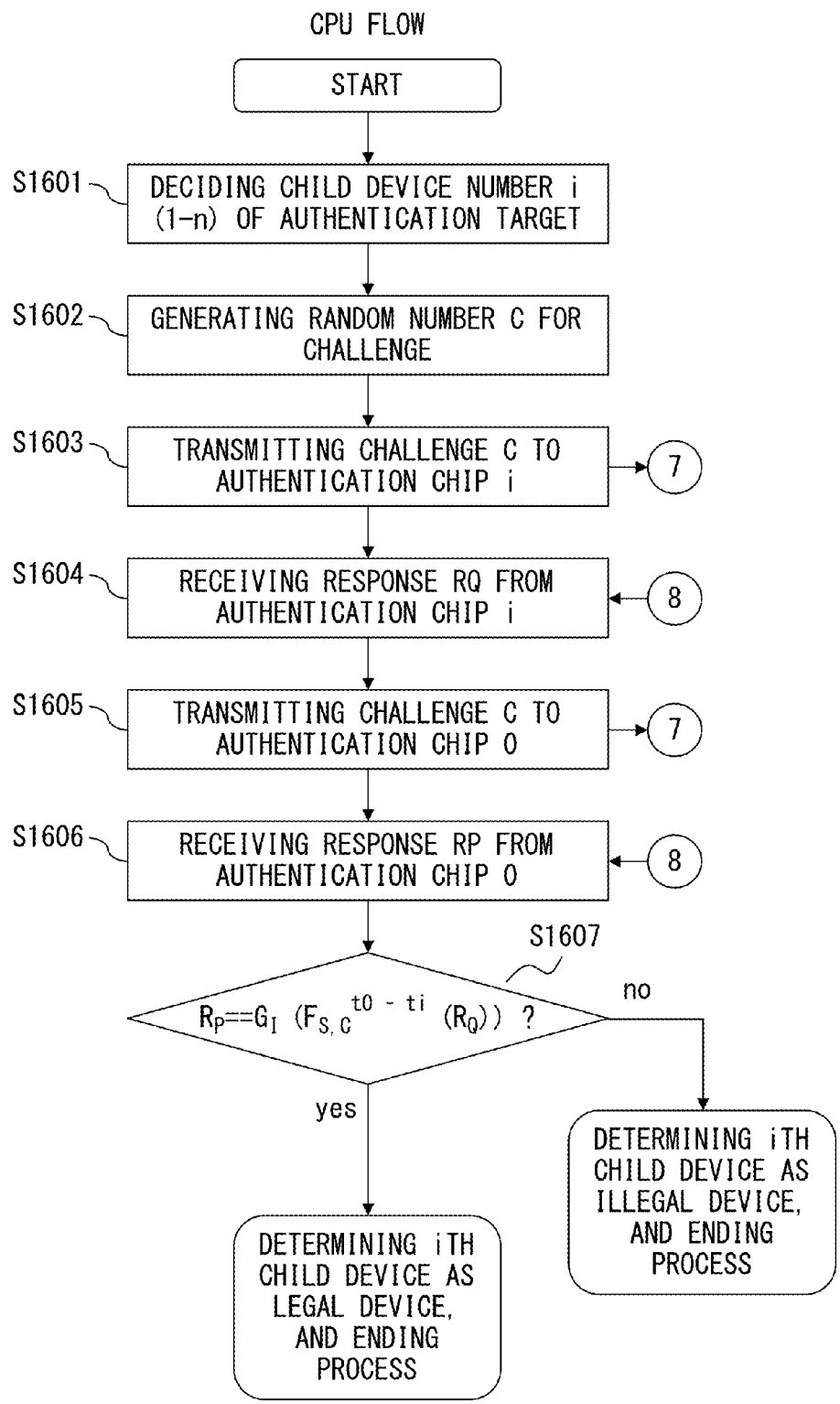
FIG. 19 is a flowchart illustrating a process executed by a CPU when an ith child device including an authentication chip i is authenticated in the system according to the fourth embodiment of the present invention.
Figure 20:
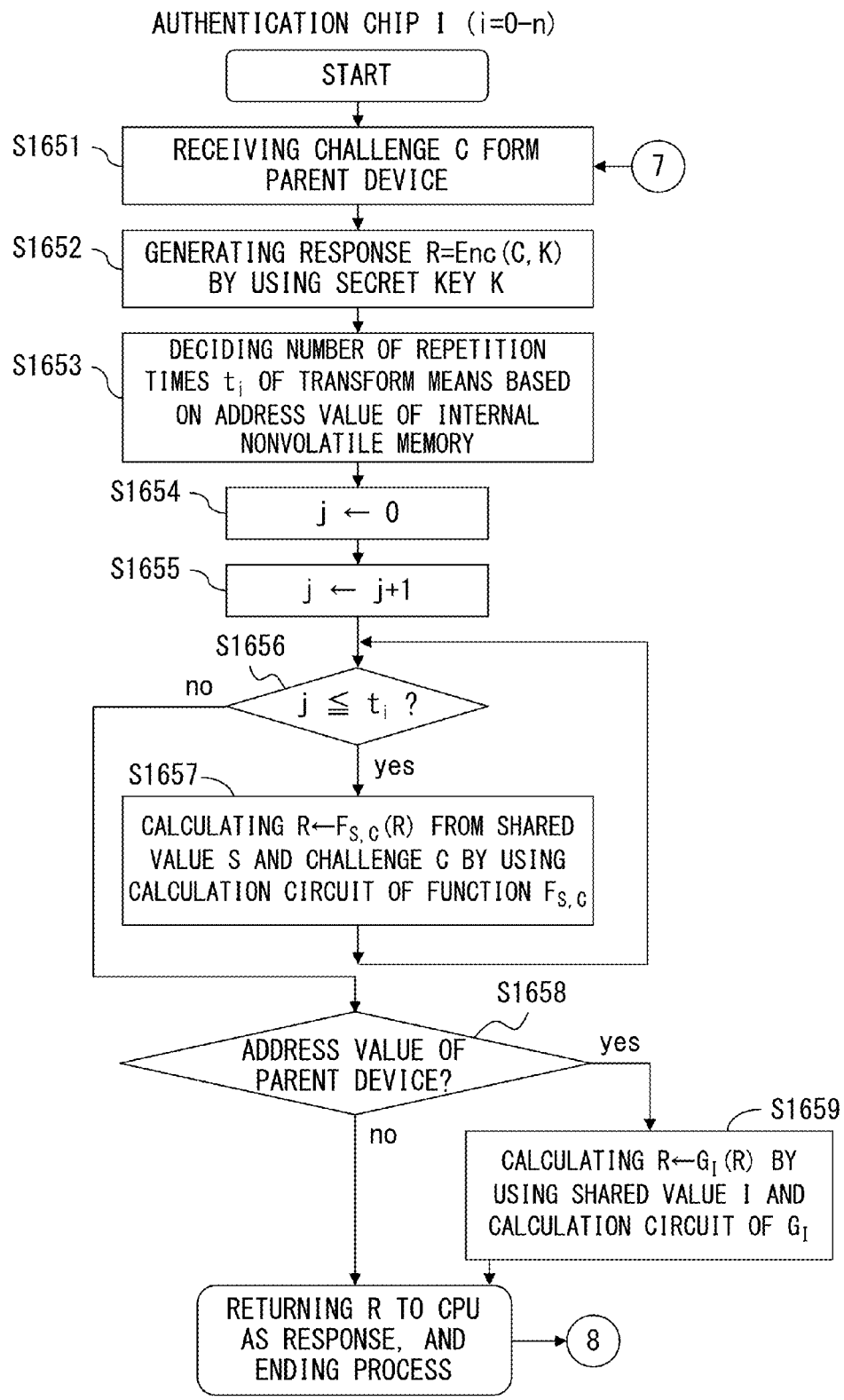
FIG. 20 is a flowchart illustrating a process executed by the authentication chip i when the ith child device including the authentication chip i is authenticated in the system according to the fourth embodiment of the present invention.

FIG. 16 illustrates the system 30 according to this embodiment. FIG. 17 is a flowchart illustrating a process executed by a CPU when an authentication chip 2200 (authentication chip 0) is mounted in the CPU. FIG. 18 is a flowchart illustrating a process executed by the authentication chip 2200 when the authentication chip 2200 (authentication chip 0) is mounted in the CPU 2100 in the authentication system 30 according to this embodiment. FIG. 19 is a flowchart illustrating a process executed by the CPU 2100 when an ith child device including an authentication chip 2300_$i$ (authentication chip i) is authenticated in the system 30 according to this embodiment. FIG. 20 is a flowchart illustrating a process executed by the authentication chip i when the ith child device including the authentication chip 2300_$i$ (authentication chip i) is authenticated in the system 30 according to this embodiment.

The system 20 according to the third embodiment has a possibility that the above described shared value S can be identified when advanced reverse engineering is performed for the CPU. An attacker can possibly identify transform function $F_{S,C}( )$ by analyzing ROM code of a program executed by the CPU. This embodiment, however, provides a system that makes it difficult to identify the transform function $F_{S,C}( )$ even when advanced reverse engineering is performed for the CPU.

The system 30 illustrated in FIG. 16 is fundamentally the same as the system 20 according to the second embodiment illustrated in FIG. 13. However, a unique value I is shared only between the authentication chip 2200 (authentication chip 0) and the CPU 2100, which are mounted in the parent device. The unique value I is shared between the CPU 2100 and the authentication chip 2200 at a time point when the authentication chip 2200 (authentication chip 0) is initially mounted in the CPU 2100 of the parent device when the entire parent device is manufactured. The unique value I is stored in an internal nonvolatile memory 2160, 2232 of the CPU 2100 and the authentication chip 2200. This is a value that cannot be rewritten thereafter. This value is a value different among individual CPUs. Since the child device is installed against the parent device after the CPU and the authentication chip 0 have shared the unique value, the authentication chips 2300_1 to 2300_$n$ (authentication chips 1 to n) of the child devices cannot learn the unique value I.

Among the plurality of transform functions provided within the authentication chip, only the transform function 0 used by the parent device outputs a response $R_P = G_I(F_{S,C}{}^{t0}(X))$ by further executing, for an output of the transform function $F_{S,C}{}^{t0}( )$ a transform function $G_I( )$ that includes the prestored unique value I as a parameter after executing the transformer $F_{S,C}{}^{t0}( )$ using S and C. The transform function 1 to n use the same method as that of the third embodiment. Namely, the transform function i outputs a response $R_Q = F_{S,C}{}^{ti}(X)$. Unlike the second and third embodiments, however, this embodiment has a constraint such that $t_0 > t_i$ needs to be set for all of $i=1, 2, \ldots, n$, namely, $t_0$ needs to be set as a maximum number of repetition times. This constraint is a condition under which the CPU 2100 identifies the response $R_Q$ from a legal child device. $G_I(X)$ may be an arbitrary function as far as this is a 1-input 1-output function that uses the unique value I as a parameter. For example, using the following functions enable an efficient implementation that reduces a circuitry scale.

(8) XOR with parameters
(9) modulo operation with parameters
(10) hash operation with parameters
(11) LFSR subtraction with parameters For example, the above described (8) is $$G_I(X) = X \oplus I$$

where I is the parameter (unique value).

For example, the above described (9) is $$G_I(X) = (I \| X) \bmod q(X)$$

where $\|$, $q(X)$, and mod are a bit concatenation, a 128-bit irreducible polynomial, and a remainder, respectively.

For example, the above described (10) is the lowest-order 128 bits of $$G_I(X) = SHA1(I \oplus X)$$

Note that SHA1(X) is an output of a SHA-1 hash function of X.

For example, the above described (11) is $$GI(X) = LFSR(I, 75) - LFSR(X, 33)$$

The CPU 2100 of the system 30 according to this embodiment includes the memory 1140 for storing the shared value S, and the memory 2160 for storing the unique value I.

The authentication chip 2200 of the parent device has a configuration similar to that of the authentication chip 1200 of the parent device in the third embodiment. However, the authentication chip 2200 is different from the authentication chip 1200 in that the it includes the nonvolatile memory 2232 for storing the unique value I, and the circuit 2230 for performing the transform G by using the function $G_I$ between the circuit 222a for performing the transform 0 and the selector 223. The circuit 2230 for performing the transform G is also connected to the memory 2280 for storing the shared value S.

The authentication chips 2300_1, ..., 2300_$n$ of the child devices have the same configuration as that of the authentication chip 2200 of the parent device except that they do not include the memory 2232 for storing the unique value I.

The transform by the transform function 0 on the parent device side is performed based on the unique value I that is shared between the CPU and the authentication chip 0 when the parent device is manufactured and is not changed thereafter. Since this value cannot be observed from the child device side, it is difficult for an attacker to estimate this value. For example, by setting the unique value I as a 128-bit parameter, a total number of round-robin combinations to be attempted by the attacker results in $2^{128}$, which cannot be decrypted in a real time frame. However, since the unique value I is a value stored also within the CPU, the attacker can possibly decrypt the unique value I by performing advanced reverse engineering for the CPU. However, the unique value I is a value different for each CPU. Therefore, even if the attacker successfully decrypts the unique value I with the advanced technique, this cannot be a great threat in terms of counterfeiting an authentication chip. The reason is that the decrypted unique value I is a value different for each parent device, and a counterfeit chip does not become that common to all devices even if the attacker can manufacture the counterfeit chip available only to a particular parent device. In the system 40 according to this embodiment, transformer of the authentication chip 0 included in the parent device is different for each CPU even if advanced reverse engineering using an analysis of ROM code of the CPU is successfully performed. Therefore, a counterfeit of an authentication chip of a child device, which is available to all parent devices, cannot be mass-produced, whereby an attacker can be prevented from distributing counterfeits on the market.

A process executed when the authentication chip 0 is mounted in the CPU in the system 30 according to this embodiment is described with reference to FIGS. 17 and 18.

The CPU 2100 generates a unique value I unique to each chip by using a random number generated within the CPU 2100, a current time, a CPUID, a serial number, and the like in S1501. Next, in S1502, the CPU 2100 transmits the unique value I to the authentication chip 2200 (authentication chip 0) of the parent device.

In S1551, the authentication chip 2200 of the parent device receives the unique value I from the CPU 2100 via the bus 400. Next, in S1552, the unique value is written to the nonvolatile memory 2232 of the authentication chip 2200. Then, the flow proceeds to S1553. In S1553, a response is transmitted to the parent device. This response is information that enables the process of S1552 to be verified, such as a result obtained by making a comparison between the value written to the nonvolatile memory 2232 and the unique value I.

The CPU 2100 receives the response from the authentication chip 2200 of the parent device in S1503. Next, in S1504, if the response from the authentication chip 2200 of the parent device, which has been received in S1503, indicates that the write operation of the unique value I in the authentication chip 2200 of the parent device has been properly performed, the flow proceeds to S1505, in which the unique value I is written to the nonvolatile memory 2160 of the CPU 2100. Here, the process of the CPU 2100 is terminated. If the determination in S1504 indicates that the write operation of the unique value I in the authentication chip 2200 of the parent device has not been properly performed, the CPU 2100 terminates the process as an error.

FIG. 19 is a flowchart illustrating a process executed by the CPU 2100 when the ith child device including the authentication chip i is authenticated in the system 30 according to this embodiment. FIG. 20 is a flowchart illustrating a process executed by the authentication chip 2300_i when the ith child device including the authentication chip i is authenticated in the system according to this embodiment.

The CPU 2100 decides a child device number i of an authentication target in S1601. Then, the flow proceeds to S1602. In S1602, a random number is generated to be used as a challenge C. In S1603 next to S1602, the challenge C generated in S1602 is transmitted to the authentication chip 2300_i of the ith child device decided in S1601.

The authentication chip 2300 of the ith child device receives the challenge C transmitted from the CPU 2100 of the parent device in S1651. Next, in S1652, an output value R=Enc(C,K) as a response is generated by using a secret key K stored in the private key storage unit 326 within the response generation circuit 324 of the authentication chip 300_i, and the challenge C. In S1653, the number of repetition times $t_I$ of the transform is decided based on address information stored in the internal nonvolatile memory 340. In S1654 to S1657 subsequent to S1653, the function $F_{S,C}$ is operated for the response R by $t_i$ times. The function $F_{S,C}$ is decided according to the shared value S and the challenge C. More specifically, 0 is assigned to a dummy variable j, which is an integer, in S1654. The value of the dummy variable is incremented by 1 in S1655, and a comparison is made between j and $t_i$ in S1656. If j is equal to or smaller than $t_i$ in S1656, the response value is updated by operating the function $F_{S,C}$ for the current response value. Then, the flow returns to S1655. If j is larger than $t_i$ in S1656, the current value of the response R is transmitted to the CPU 2100, and the process of the authentication chip 2300_i of the ith child device is terminated.

The CPU 2100 receives the value of the response R from the authentication chip 2300_i of the ith child device as a response $R_Q$ in S1604. Next, the CPU 2100 transmits the challenge C to the authentication chip 2200 of the parent device in S1605.

The authentication chip 2200 of the parent device executes the same process as the above described process of the authentication chip 2300_i of the ith child device. However, the number of times that the function $F_{S,C}$ is operated is $t_0$, which is different from $t_i$ in the case of the authentication chip 2300_i of the ith child device.

The CPU 2100 receives the value of the response R from the authentication chip 2200 of the parent device as a response $R_P$ in S1606. Next, in S1607, whether or not $R_P$ and $G_j(F_{S,C}^{t0-ti}(X))$ are equal is determined. If they are equal, the ith child device is determined as a legal device, and the process of the CPU 100 is terminated. Otherwise, the ith child device is determined as an illegal device, and the process of the CPU 2100 is terminated.

In the above description, the processes of S1605 and S1606 are executed after the processes of S1603 and S1604. However, the processes of S1603 and S1604 may be executed after the processes of S1605 and S1606. Namely, the order of the transmission of the challenge C to the authentication chip 2200 and the reception of the response $R_P$ of the parent device, and the transmission of the challenge C to the authentication chip 2300_i and the reception of the response $R_Q$ of the child device is arbitrary.

By employing such a configuration, secure authentication that avoids even attacks using advanced reverse engineering can be implemented. Moreover, identification of transform function by tapping communication data is made difficult.

Fifth Embodiment

Figure 21:
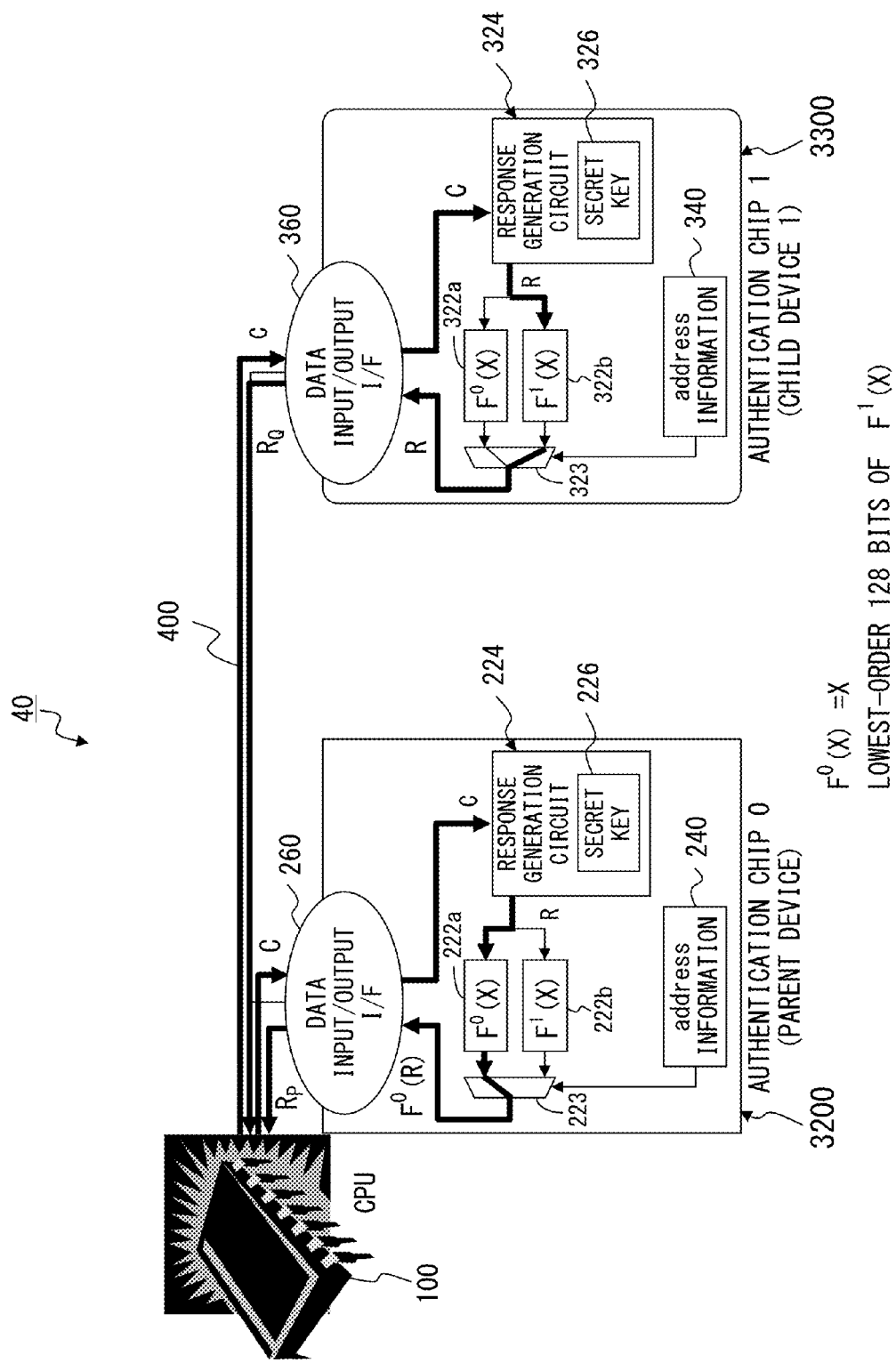
FIG. 21 illustrates a system according to a fifth embodiment of the present invention.

A system 40 according to a fifth embodiment of the present invention is described with reference to FIGS. 21 to 23. This embodiment is a special case of the system 10 according to the second embodiment illustrated in FIG. 10. Namely, in this embodiment, two types of transform functions such as $F^0(X)=X$, and the lowest-order 128 bits of the output of $F^1(X)=SHA-1$ are used.

Authentication chips 3200 and 3300 are respectively connected to a parent device and a child device. All of a challenge, a response, and a secret key are of 128 bits. As the function F, the lowest-order 128 bits of the output of SHA-1 are used. The number of repetition times of the function F is $t_0=1$ and $t_1=0$. Namely, an output value R=Enc(C,K) is generated by using AES encryption for the challenge C transmitted from the CPU 100. If an address of the authentication chip is of the parent device, $R_P=F(R)$ is returned to the CPU 100 as a response. Alternatively, if the address of the authentication chip is of the child device, $R_Q=R$ is returned to the CPU 100 as a response. The CPU 100 that has received the responses $R_P$ and $R_Q$ calculates $F(R_Q)$. If the F ($R_Q$) and $R_P$ match, the CPU 100 determines the child device as a legal device. Alternatively, if they mismatch, the CPU 100 determines the child device as an illegal device.

Figure 22:
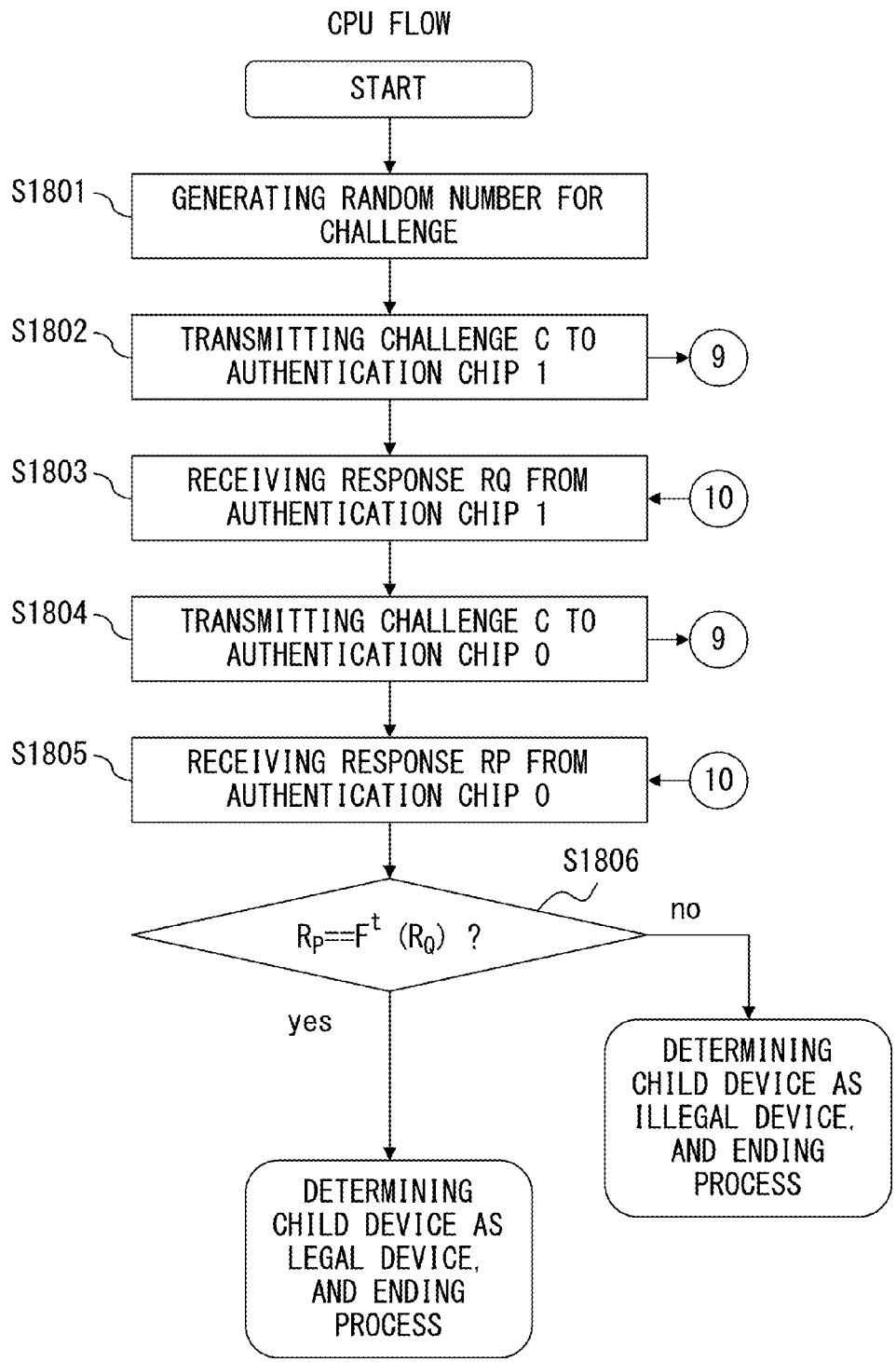
FIG. 22 is a flowchart illustrating a process executed by a CPU of the system according to the fifth embodiment of the present invention.
Figure 23:
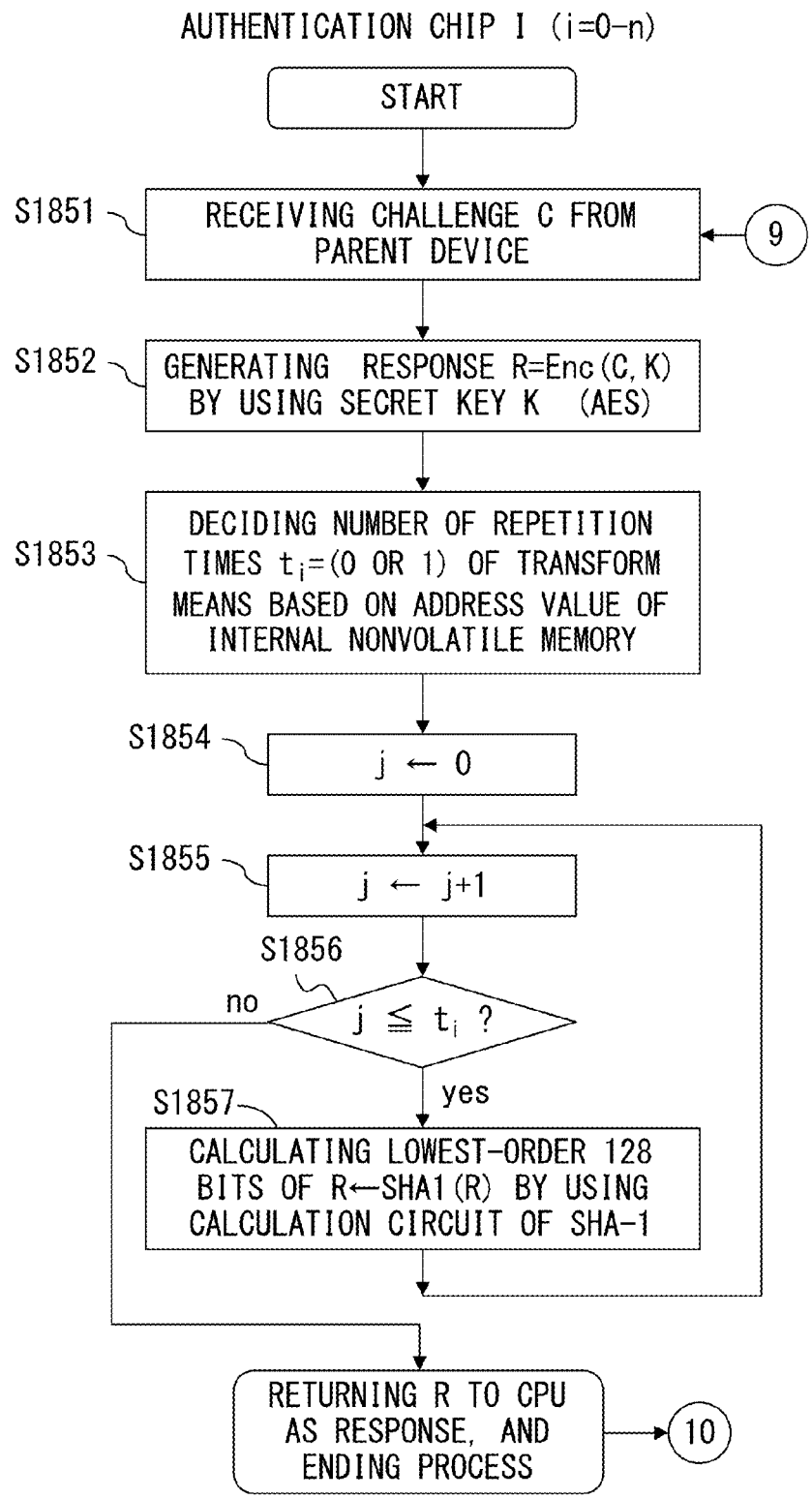
FIG. 23 is a flowchart illustrating a process executed by an authentication chip 0 of the system according to the fifth embodiment of the present invention.

FIG. 22 is a flowchart illustrating a process executed by the CPU 100 of the system 40 according to this embodiment. FIG. 23 is a flowchart illustrating a process executed by the authentication chip 3200 of the parent device and the authentication chip 3300 of the child device in the system 40 according to this embodiment.

The CPU 100 generates a random number to be used as a challenge C in S1801. Then, the flow proceeds to S1802. In S1802, the challenge C generated in S1802 is transmitted to the authentication chip 3300 of the child device.

The authentication chip 3300 of the child device receives the challenge C transmitted from the CPU 100 of the parent device in S1851. Next, in S1852, an output value R=Enc(C, K) as a response is generated by using a secret key K stored in the secret key storage unit 326 within the response generation circuit 324 of the authentication chip 3300, and the challenge C. In S1853, the number of repetition times $t_i$ of the transform is decided based on address information stored in the internal nonvolatile memory 340. Here, $t_i$=1. In S1854 to S1857 subsequent to S1853, the lowest-order 128 bits of the output of Function F=SHA-1 are operated for the output value R by $t_i$ times. More specifically, 0 is assigned to a dummy variable j, which is an integer, in S1854. The value of the dummy variable is incremented by 1 in S1855, and a comparison is made between j and $t_1$ in S1856. If j is equal to or smaller than $t_1$ in S1856, the response value is updated by operating the function F for the current response value in S1857. Then, the flow returns to S1855. If j is larger than $t_i$ in S1856, the current value of the response R is transmitted to the CPU 100, and the process of the authentication chip 3300 of the child device is terminated.

The CPU 100 receives the value of the response R from the authentication chip 3300 of the child device as a response $R_Q$ in S1803. Next, the challenge C is transmitted to the authentication chip 200 of the parent device in S1804.

The authentication chip 3200 of the parent device executes the same process as the above described process of the authentication chip 3300 of the child device. However, the number of times that the function F is operated is $t_0$=1, which is different from $t_i$=0 in the case of the authentication chip 3300 of the child device.

The CPU 100 receives the value of the response R from the authentication chip 3200 of the parent device as a response $R_P$. Next, in S1806, whether or not the value F ($R_P$) obtained by operating the function F for $R_P$ and $R_Q$ are equal is determined. If they are equal, the child device is determined as a legal device, and the process of the CPU 100 is terminated. Otherwise, the child device is determined as an illegal device.

In the above provided description, the processes of S1804 and S1805 are executed after the processes of S1802 and S1803. However, the processes of S1802 and S1803 may be executed after the processes of S1804 and S1805.

Sixth Embodiment

A system 50 according to a sixth embodiment of the present invention is described with reference to FIGS. 24 to 26. This embodiment is a special case of the system 20 according to the third embodiment illustrated in FIG. 13. Namely, in this embodiment, two authentication chips such as an authentication chip 4300_1 of a child device 1 and an authentication chip 4300_2 of a child device 2 are included, and $F^0(x)=x$, and $F^1(x)=(S+X)\oplus C$, $F2(x)=F^1(F^1(x))$ are prepared as functions to be operated for a response generated by the response generation circuit 324.

FIG. 24 illustrates a configuration of this embodiment. An authentication chip 4200 is connected to the parent device, whereas the two authentication chips 4300_1 and 4300_2 are connected to the child devices. All of a challenge, a response, and a secret key are of 128 bits. An XOR addition with parameters $F_{S,C}(X)=(S+X)\oplus C$ is used as a function $F_{S,C}$. The number of repetition times of the function $F_{S,C}$ is $t_0$=0, $t_1$=1, or $t_2$=2. Namely, R=Enc(C,K) is generated by using ASE encryption in the response generation circuit 224, 324 for the challenge C transmitted from the CPU 1100. If an address of the authentication chip is of the parent device, $R_P$=R is returned to the CPU 100 as a response. If the address of the authentication chip is of the child device 1, $R_Q=F_{S,C}(R)$ is returned to the CPU 100 as a response. Alternatively, if the address of the authentication chip is of the child device 2, $R_Q=F_{S,C}^2(R)$ is returned to the CPU 1100 as a response. The CPU 1100 that has received $R_P$ and $R_Q$ calculates $F^{ti-t0}(R_P)$. The CPU 1100 determines the child device as a legal device if the calculated $F^{ti-t0}(R_P)$ and $R_Q$ match, or determines the child device as an illegal device if $F^{ti-t0}(R_P)$ and $R_Q$ mismatch. Namely, whether or not $F_{S,C}(R_P)=R_Q$ is determined if i=1, or whether or not $c^2(R_P)=R_Q$ is determined if i=2.

A process of the authentication system 50 according to this embodiment is described.

Figure 25:
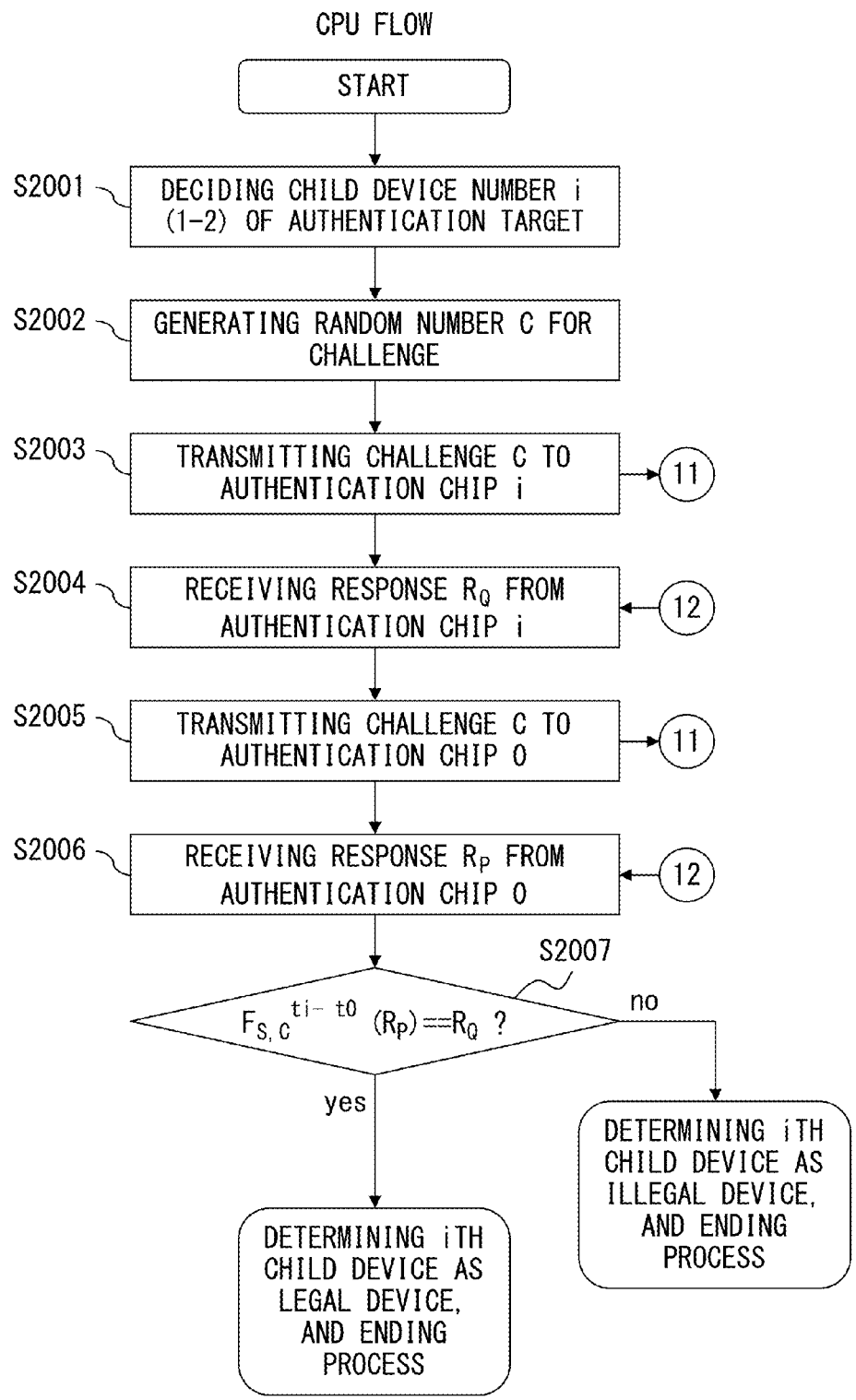
FIG. 25 is a flowchart illustrating a process executed by a CPU of the system according to the sixth embodiment of the present invention.
Figure 26:
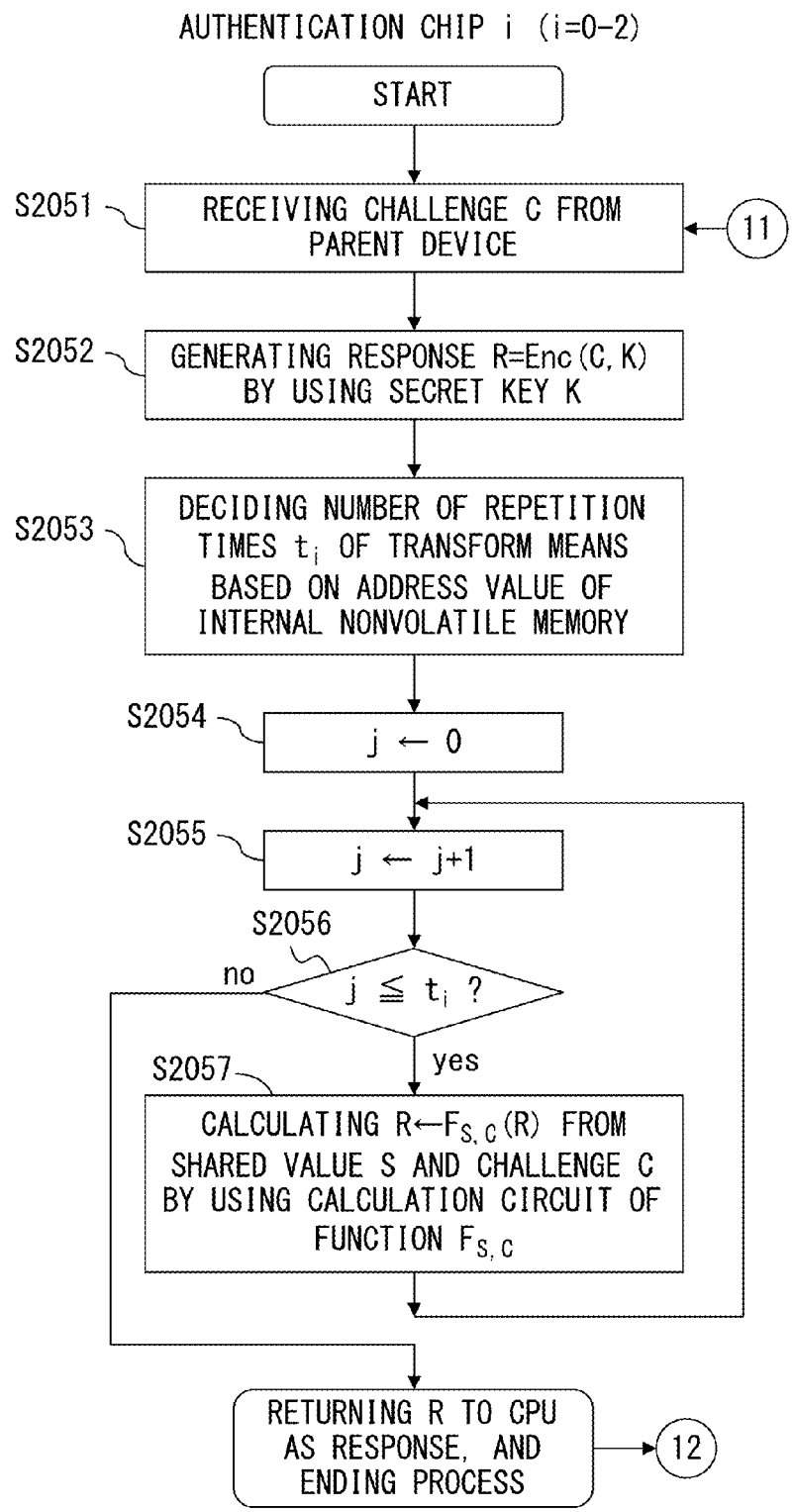
FIG. 26 is a flowchart illustrating a process executed by an authentication chip 0 of the system according to the sixth embodiment of the present invention.

FIG. 25 is a flowchart illustrating a process executed by the CPU 1100 of the system 50 according to this embodiment. FIG. 26 is a flowchart illustrating a process executed by the authentication chip 4200 or 4300_i (i=1, 2) of the parent device or the child device in the system 50 according to this embodiment.

The CPU 1100 decides a child device number i of an authentication target in S2001. Then, the flow proceeds to S2002. Here, i=1 or 2. In S2002, a random number is generated to be used as a challenge C. In S2003 next to S2002, the challenge C generated in S2002 is transmitted to the authentication chip 4300_i of the ith child device, which is decided in S2001.

The authentication chip 4300_i of the ith child device receives the challenge C transmitted from the CPU 1100 of the parent device in S2051. Next, in S2052, an output value R=Enc(C,K) as a response is generated by using a secret key K stored in the secret key storage unit 326 within the response generation circuit 324 of the authentication chip 4300_i, and the challenge C. In S2053, the number of repetition times $t_i$ of the transform is decided based on address information stored in the internal nonvolatile memory 340. In S2054 to S2057 subsequent to S2053, the function $F_{S,C}$ is operated for the response R by $t_i$ times. The function $F_{S,C}$ is decided according to the shared value S and the challenge C. More specifically, 0 is assigned to a dummy variable j, which is an integer, in S2054. The value of the dummy variable is incremented by 1 in S2055, and a comparison is made between j and $t_i$. If j is equal to or smaller than $t_i$ in S2056, the response value is updated by operating the function $F_{S,C}$ for the current response value in S2057. Then, the flow returns to S2055. If j is larger than $t_i$ in S2056, the current value of the response R is transmitted to the CPU 1100, and the process of the authentication chip 1300_i of the ith child device is terminated.

The CPU 1100 receives the value of the response R as a response $R_Q$ from the authentication chip 4300_i of the ith child device in S2004. Next, the challenge C is transmitted to the authentication chip 4200 of the parent device in S2005.

The authentication chip 4200 of the parent device executes the same process as the above described process of the authentication chip 4300_i of the ith child device. However, the number of times that the function $F_{S,C}$ is operated is $t_0$, which is different from $t_i$ in the case of the authentication chip 300_i of the ith child device. Since $t_0$=0 in this case, the function $F_{S,C}$ is not operated.

The CPU 1100 receives the value of the response R from the authentication chip 4200 of the parent device as a response $R_P$ in S2006. Next, In S2007, whether or not $R_Q$ and $F_{S,C}^{t0-ti}(R_P)$ are equal. If they are equal, the ith child device is determined as a legal device, and the process of the CPU 1100 is terminated. Otherwise, the ith child device is determined as an illegal device, and the process of the CPU 1100 is terminated.

Seventh Embodiment

A system 60 according to a seventh embodiment of the present invention is described with reference to FIGS. 27 to 31. This embodiment is a special case of the system 30 according to the fourth embodiment illustrated in FIG. 16. Namely, in this embodiment, two authentication chips such as an authentication chip 5300_1 of a child device 1 and an authentication chip 5300_2 of a child device 2 are included as authentication chips of the child devices, and a modulo operation with parameters $F_{S,C}(X)=(S\|C\|X) \bmod q(X)$, and the lowest-order 128 bits of $G_I(X)=SHA1\ (I \oplus X)$ are used respectively as a transform function $F_{S,C}$ operated for a response generated by the response generation circuit 324, and as a transform function $G_I$.

To the parent device, the authentication chip 5200 is connected. To the child devices, the two authentication chips 5300_1 and 5300_2 are connected. All of a challenge, a response, and a secret key are of 128 bits. A modulo operation with parameters $F_{S,C}(X)=S\|C\|X) \bmod q(X)$, and the lowest-order 128 bits of a hash operation with parameters SHA1 $(I \oplus X)$ are used respectively as the function $F_{S,C}$ and the function $G_I$. Note that $q(X)$ is a 128-bit irreducible polynomial. The number of repetition times of the function $F_{S,C}$ is $t_0=2$, $t_1=1$, or $t_2=0$. Namely, $R=Esc\ (C,K)$ to the challenge C transmitted from the CPU 2100 is generated by using AES encryption. If an address of the authentication chip is of the parent device, $R_P=G_I(F_{S,C}{}^2(R))$ is returned to the CPU 2100 as a response. If the address of the authentication chip is of the child device 1, $R_Q=F_{S,C}(R)$ is returned to the CPU 2100 as a response. Alternatively, if the address of the authentication chip is of the child device 2, $R_Q=R$ is returned to the CPU 2100 as a response. The CPU 2100 that has received $R_P$ and $R_Q$ calculates $G_I(F_{S,C}{}^{2-ti}(R_Q))$. If $G_I(F_{S,C}{}^{2-ti}(R_Q))$ and $R_P$ match, the child device is determined as a legal device. Alternatively, if they mismatch, the child device is determined as an illegal device. Namely, whether or not $G_I(F_{S,C}(R_Q))=R_P$ is determined if i=1, or whether or not $G_I(F_{S,C}{}^2(R_Q))=R_P$ is determined if i=1.

Figure 29:
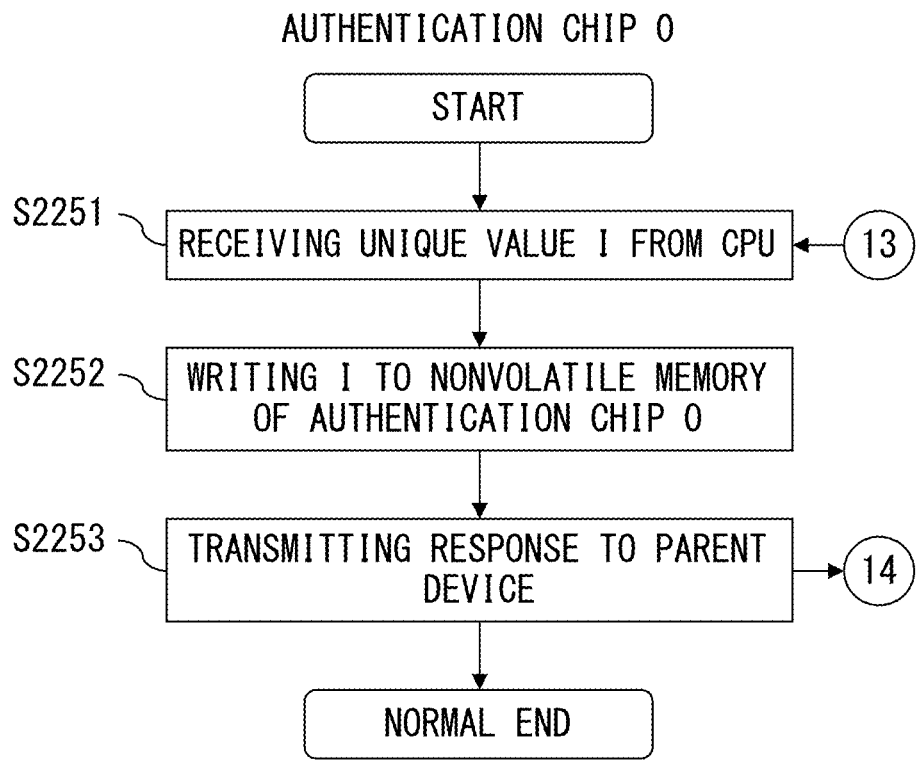
FIG. 29 is a flowchart illustrating a process executed by the authentication chip 0 when the authentication chip 0 is mounted in the CPU in the system according to the seventh embodiment of the present invention.

A process executed when the authentication chip 5200 is mounted in the CPU 2100 in the system 60 according to this embodiment is described with reference to FIGS. 28 and 29.

The CPU 2100 generates a unique value I unique to each CPU by using a random number generated within the CPU 2100, a current time, a CPUID, a serial number, and the like. Next, in S2202, the unique value I is transmitted to the authentication chip 5200 (authentication chip 0) of the parent device.

In S2251, the authentication chip 5200 of the parent device receives the unique value I from the CPU 2100 via the bus 400. Next, in S2252, the unique value I is written to the nonvolatile memory 2232 of the authentication chip 5200. Then, the flow proceeds to S2253. In S2253, a response is transmitted to the parent device. This response is information that enables the process of S2252 to be verified, such as a result of a comparison made between the value written to the nonvolatile memory 2232 and the unique value I.

The CPU 2100 receives the response from the authentication chip 5200 of the parent device in S2203. In S2204, if the response from the authentication chip 5200 of the parent device, which has been received in S2203, indicates that the write operation of the unique value I has been properly performed in the authentication chip 5200 of the parent device, the flow proceeds to S2205, in which the unique value I is written to the internal nonvolatile memory 2160 of the CPU 2100, and the process of the CPU 2100 is terminated. If the response from the authentication chip 5200 of the parent device, which has been received in S2203, indicates that the write operation of the unique value I in the authentication chip 5200 of the parent device has not been properly performed, the CPU 2100 terminates the process as an error.

Figure 30:
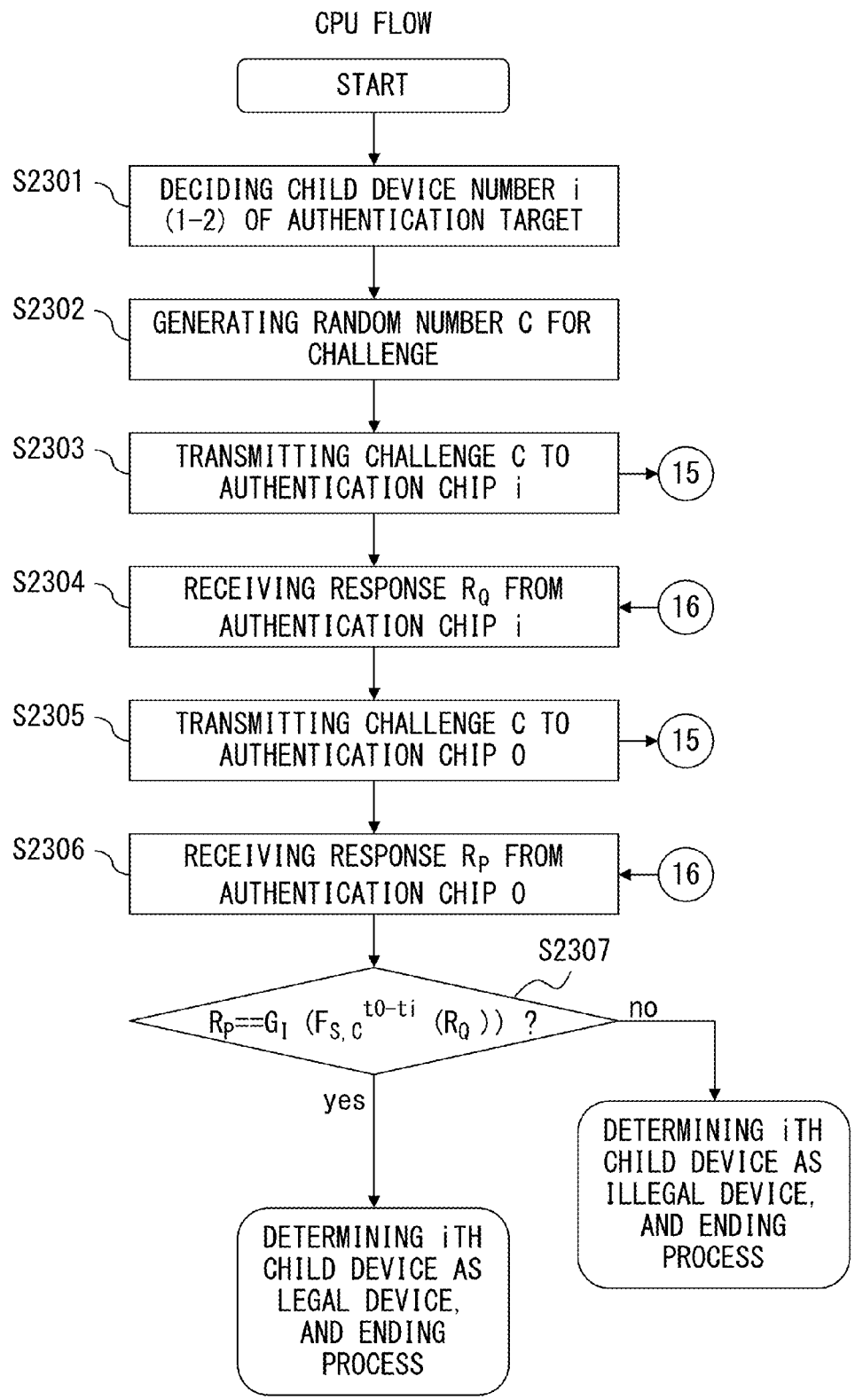
FIG. 30 is a flowchart illustrating a process executed by the CPU when an ith child device including an authentication chip i is authenticated in the system according to the seventh embodiment of the present invention.
Figure 31:
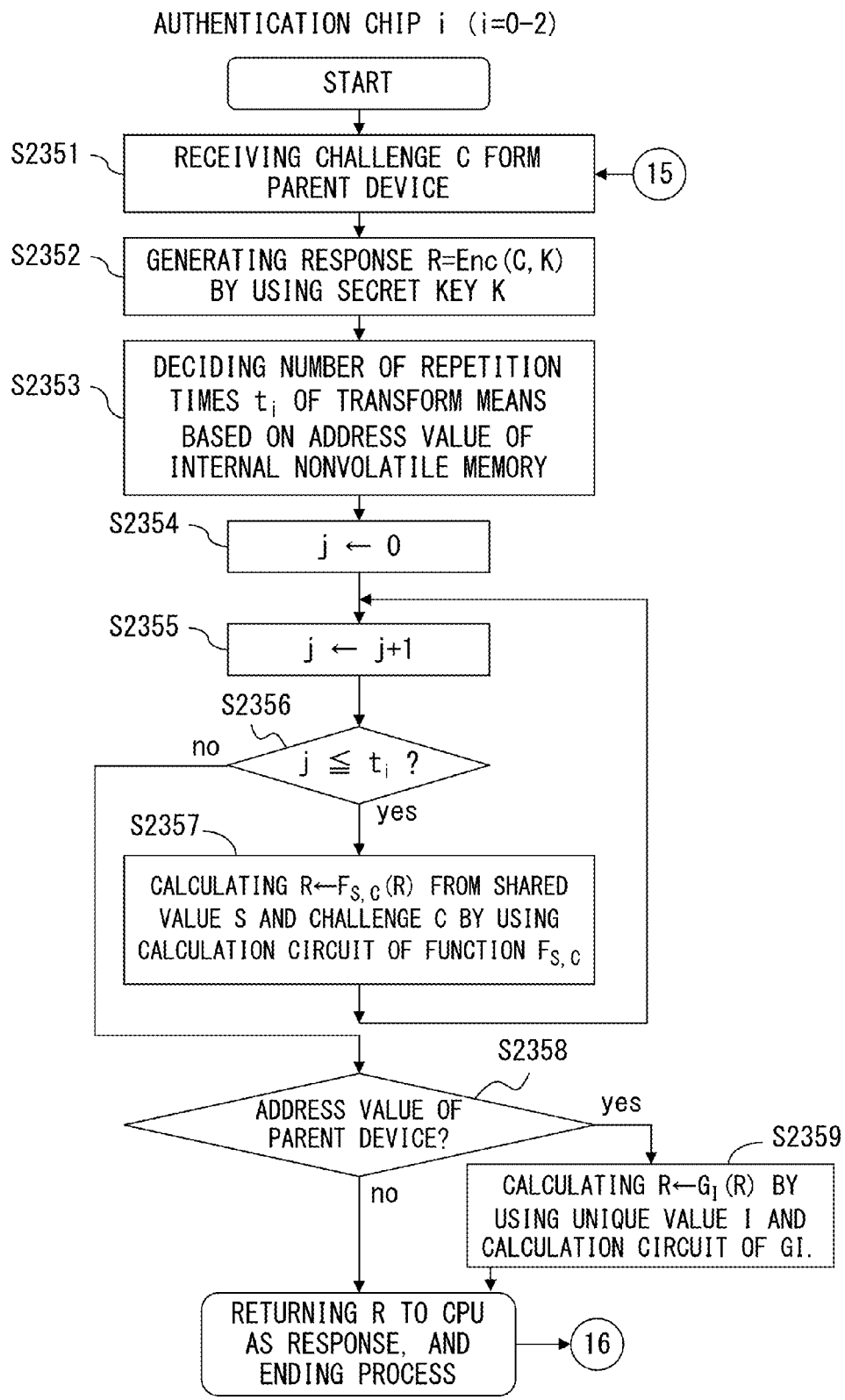
FIG. 31 is a flowchart illustrating a process executed by the authentication chip i when the ith child device including the authentication chip i is authenticated in the system according to the seventh embodiment of the present invention.

FIG. 30 is a flowchart illustrating a process executed by the CPU 2100 when the parent device and the ith child device, which include the authentication chip (authentication chip 0 to 2) 5200, and 5300_1 or 5300_2, are authenticated in the system according to this embodiment. FIG. 31 is a flowchart illustrating a process executed by the authentication chip 5200, 5300_i (i=1,2) when the parent device or the ith child device, which includes the authentication chip i, is authenticated in the system according to this embodiment.

The CPU 2100 decides a child device number i of an authentication target in S2301. Then, the flow proceeds to S2302. In S2302, a random number is generated to be used as a challenge C. In S2303 next to S2302, the challenge C generated in S2302 is transmitted to the authentication chip 5300_i of the ith child device decided in S2301.

The authentication chip 5300 of the ith child device receives the challenge C transmitted from the CPU 2100 of the parent device in S2351. Next, in S2352, an output value R=Enc(C, K) as a response is generated by using a secret key K stored in the secret key storage unit 326 within the response generation circuit 324 of the authentication chip 5300_i, and the challenge C. In S2353, the number of repetition times $t_i$ of the transform is decided based on address information stored in the internal nonvolatile memory 340. In S2354 to S2357 subsequent to S2353, the function $F_{S,C}$ is operated for the response R by $t_i$ times. The function $F_{S,C}$ is decided according to the shared value S and the challenge C. More specifically, 0 is assigned to a dummy variable j, which is an integer, in S1654. The value of the dummy variable is incremented by 1 in S2355, and a comparison is made between j and $t_i$ in S2356. If j is equal to or smaller than $t_i$ in S2356, the response value is updated by operating the function $F_{S,C}$ for the current response value in S2357. Then, the flow returns to S2355. If j is not smaller than $t_i$ in S2356, the flow proceeds to S2358. In S2358, whether or not the chip currently being authenticated is of the parent device is determined. Since the authentication chip is not of the parent device in this case, the current value of the response R is transmitted to the CPU 2100, and the process of the authentication chip 5300_i of the ith child device is terminated.

The CPU 2100 receives the value of the response R as a response $R_Q$ from the authentication chip 2300_i of the ith child device in S2304. Next, the challenge C is transmitted to the authentication chip 5200 of the parent device in S2305.

The authentication chip 5200 of the parent device executes the same process as the above described process of the authentication chip 5300_i of the ith child device. However, the process of the authentication chip 5200 is different from the process of the authentication chip 5300_i in that the number of times that the function $F_{S,C}$ is operated is $t_0$, which is different from $t_i$ in the case of the authentication chip 5300 of the ith child device, and the chip currently being authenticated in S2358 is of the parent device in the determination of whether or not the chip is of the parent device, so that the flow process to S2359. In S2359, $G_I(F_{S,C}{}^{2-ti}(RQ))$ is calculated by using the unique value I and the GI calculation circuit 2230.

The CPU 2100 receives the value of the response R from the authentication chip 2200 of the parent device as a response $R_P$ in S2306. Next, whether or not $R_P$ and $G_I(F_{S,C}{}^{2-ti}$ ($R_Q$)) are equal is determined in S1607. If they are equal, the ith child device is determined as a legal device, and the process of the CPU 2100 is terminated. Otherwise, the ith child device is determined as an illegal device, and the process of the CPU 2100 is terminated.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An authentication method for authenticating, by a processor that controls a first device including a first authentication chip, a second device including a second authentication chip, the method comprising:
    generating a random number;
    transmitting the random number to the first authentication chip and the second authentication chip;
    receiving, from the first authentication chip, a first response value obtained by operating a first transform function, which is decided based on a value set in the first authentication chip, for an output value generated by operating an encryption function for performing encryption for an integer stored in the first authentication chip as a secret key and the random number;
    receiving, from the second authentication chip, a second response value obtained by operating a second transform function, which is decided based on a value set in the second authentication chip, for the output value generated by operating the encryption function for performing encryption for an integer, which is stored in the second authentication chip as a secret key and is the same as the integer stored in the first authentication chip as the secret key, and the random number; and
    authenticating the second device by making a comparison between a value obtained by operating, for the first response value, a third transform function, which is decided based on a number of a difference between the value set in the first authentication chip and the value set in the second authentication chip, and the second response value, or by making a comparison between a value obtained by operating the third transform function for the second response value and the first response value.

2. The method according to claim 1, wherein
    the first transform function decided based on the value set in the first authentication chip is a power of a specified function,
    an exponent of the power is a first exponent decided based on the value set in the first authentication chip,
    the second transform function decided based on the value set in the second authentication chip is a power of the specified function,
    an exponent of the power is a second exponent that is decided based on the value set in the second authentication chip and is different from the first exponent,
    the third transform function decided based on the number of the difference between the value set in the first authentication chip and the value set in the second authentication chip is a power of the specified function, and an exponent of the power is a third exponent equal to an absolute value of a difference between the first exponent and the second exponent.

3. The method according to claim 2, wherein the specified function is a hash function.

4. The method according to claim 2, wherein the specified function is a constant bit shift.

5. The method according to claim 2, wherein the specified function is repetitions of a modulo operation process of a characteristic polynomial in $GF(2^m)$ by the number of bits of a constant after a 1-bit left shift.

6. The method according to claim 1, wherein
    the first transform function is decided based on the value set in the first authentication chip, and a shared value, which is an integer preset in common to the second authentication chip, and
    the second transform function is decided based on the value set in the second authentication chip, and the shared value.

7. The method according to claim 1, wherein the first response value is obtained by operating a fourth transform function decided based on a unique value, which is a value unique to the processor, for the output value in addition to the first transform function.

8. The method according to claim 6, wherein the second transform function decided based on the value set in the second authentication chip and the shared value is an XOR operation with parameters.

9. The method according to claim 6, wherein the second transform function decided based on the value set in the second authentication chip and the shared value is a modulo operation with parameters.

10. The method according to claim 6, wherein the second transform function decided based on the value set in the second authentication chip and the shared value is an operation for taking out data values of a width of lowest-order bits of a constant of a hash operation with parameters.

11. The method according to claim 6, wherein the second transform function decided based on the value set in the second authentication chip and the shared value is a calculation implemented by combining a constant bit shift with parameters, XOR, and a subtraction.

12. The method according to claim 1, wherein
    the processor, the first authentication chip, and the second authentication chip are connected by a serial bus for a mutual communication,
    the authentication chip of the first device and the authentication chip of the second device respectively have a first address and a second address for the communication, and
    a value set in the authentication chip of the first device and a value set in the authentication chip of the second device are decided respectively based on the first address and the second address.

13. An authentication system where a first device authenticates a second device, comprising:
    a processor, included in the first device, configured to execute a process for generating a random number, for transmitting the random number to a first authentication chip included in the first device and a second authentication chip included in the second device, for respectively receiving a first response value and a second response value as responses to the random number from the first authentication chip and the second authentication chip, and for authenticating the second device by using the first response value and the second response value;

the first authentication chip, connected to the processor, comprising
- a first random number receiver configured to receive the random number,
- a first storage configured to store an integer as a secret key,
- a first encryption calculator configured to generate an output value by operating an encryption function for performing encryption for the integer stored as the secret key and the random number, and
- a first response value generator configured to generate the first response value by operating a first transform function decided based on a first set value for the generated output value; and a second authentication chip, connected to at least the processor, comprising
- a second random number receiver configured to receive the random number,
- a second storage configured to store the integer, which is the same as the integer stored in the first authentication chip, as a secret key,
- a second encryption calculator configured to generate an output value by operating an encryption function for performing encryption for the integer stored as the secret key and the random number, and
- a second response value generator configured to generate the second response value by operating a second transform function decided based on a second set value for the output value which is generated by the second encryption calculator, wherein the processor executes the process for authenticating the second device by making a comparison between a number, which is obtained by operating, for the first response value, a third transform function decided based on an absolute value of a difference between the first set value and the second set value, and the second response value, or by making a comparison between a number obtained by operating the third transform function for the second response value and the first response value.

* * * * *